United States Patent [19]
Mukai et al.

[11] Patent Number: 5,099,507
[45] Date of Patent: Mar. 24, 1992

[54] AUTO-DIALING APPARATUS AND AUTO-DIALING TYPE PAGING RECEIVER INCLUDING IMPROVED CALLING FUNCTIONS

[75] Inventors: Yoshiaki Mukai, Ome; Tateki Oishi, Hamuramachi, both of Japan

[73] Assignee: Casio Computer Co., Ltd., Tokyo, Japan

[21] Appl. No.: 409,045

[22] Filed: Sep. 18, 1989

[30] Foreign Application Priority Data

| Sep. 20, 1988 | [JP] | Japan | 63-122951[U] |
| Sep. 20, 1988 | [JP] | Japan | 63-122952[U] |
| Sep. 20, 1988 | [JP] | Japan | 63-122953[U] |
| Sep. 20, 1988 | [JP] | Japan | 63-122955[U] |
| Sep. 20, 1988 | [JP] | Japan | 63-122956[U] |
| Sep. 20, 1988 | [JP] | Japan | 63-123384[U] |

[51] Int. Cl.⁵ .................. H04M 11/00; H04M 1/27
[52] U.S. Cl. ............................ 379/57; 379/355; 379/91
[58] Field of Search .................. 379/56-58, 379/91, 354-357, 200, 216; 340/311.11, 825.44 H

[56] References Cited

U.S. PATENT DOCUMENTS

| 4,126,768 | 11/1978 | Grenzow | 379/357 |
| 4,490,579 | 12/1984 | Godoshian | 340/825.44 |
| 4,585,904 | 4/1986 | Mincone et al. | 379/200 |

FOREIGN PATENT DOCUMENTS 3329267  2/1985  Fed. Rep. of Germany ........ 379/58

Primary Examiner—James L. Dwyer
Assistant Examiner—Dwayne D. Bost
Attorney, Agent, or Firm—Frishauf, Holtz, Goodman & Woodward

[57] ABSTRACT

In a radio paging receiver equipped with an auto-dialing function, there are provided a message data receiver; a message data memory; a message data readout unit; a message data display unit; and a selecting unit for selecting a telephone number portion contained in the message data. Then, the data selected by the selecting unit is converted into a corresponding dialing tone signal, whereby a desired display tone is automatically generated and input to a telephone handset.

24 Claims, 22 Drawing Sheets

TRANSMISSION SIGNAL FORMAT

BATCH FORMAT

ADDRESS CODE WORD

MESSAGE CODE WORD

AUTO-DIALING APPARATUS AND AUTO-DIALING TYPE PAGING RECEIVER INCLUDING IMPROVED CALLING FUNCTIONS

BACKGROUND OF THE INVENTION

1. Field of the Invention

The present invention generally relates to an auto-dialing type paging receiver. More specifically, the present invention is directed to an auto-dialing type paging receiver including improved calling functions and also protection against private use of the paging receiver, and also to an auto-dialing apparatus.

2. Description of the Related Art

Very recently, not only radio paging operation is performed, but also meassage information subsequent to the selected calling number is transmitted, and then the transmitted message information is displayed on a display unit on a radio receiver in a conventional radio paging system.

Such a radio paging system has been widely utilized as a business communication means. Mainly, workers holding the radio paging receivers, outside their offices are called by the paging system to receive calling message information, for instance, a telephone number and the like.

For this purpose, the paging receivers equipped with the aurt-dialing function have been proposed, which include a dialing tone (dual multifrequency signal for a push tone telephone receiver) generating means.

The above-described paging receiver is known in the field from, for instance, U.S. Pat. No. 4,490,579 to Godoshian, entitled "AUTO-DIALING PAGING RECEIVER", patented on Dec. 25, 1984. In this known paging receiver, the telephone number is received as the message information, and the dialing tone corresponding to this received telephone number can be produced by way of the switch operation. As is known, since a telephone call can be made inputting the produced dialing tone into the telephone handset of the push tone type telephone receiver, instead of the button operation by this telephone receiver, such an auto-dialing paging receiver is very useful for any telephone callers However, as the conventional auto-dialing paging receiver disclosed in U.S. Pat. No. 4,490,579 intends to be operated under the condition that the received message is constructed of only the calling telephone number, the wide utilization of this paging receiver can be hardly expected, taking account of the recent customers needs. That is, in general, a typical message content of a caller involves not only a calling telephone number, but also other information (i.e., want to receive a telephone call at a predetermine time). For instance, if a telephone call is required at 14-00 to "03-123-4567", a specific code for designating a time (indicated by "1") and a calling telephone number indicated by "2") is predetermined between a caller and a callee who holds a radio paging receiver, whereby as the message,"(1) 14-00 (2) 03-123-4567" is sent from the caller to the callee by way of the radio paging receiver.

However, when such a predetermined information is received by the conventional auto-dialing paging receiver, the calling telephone number "03-123-4567" cannot be called by utilizing the auto-dialing operation.

In another conventional paging receiver equipped with the display function, but not with the auto-dialing function, typical message phases such as "Call to the following telephone number at the following time" have been previously stored into the internal memory. When the typical message phrase code for designating the typical message phrase is received, the typical message phrase corresponding to the received typical message phrase code is read out from the internal memory so as to be decoded, and the decoded message is displayed.

In case that the above-described message is sent to a callee who holds this type of paging receiver, a caller transmits the typical message phrase code for designating the content of the typical message phrase "Call to the following telephone number at the following time", and both time information "14-00" and telephone number information "03-123-4567" as the parameter thereof.

However, even if a typical message phrase memory is employed in the conventional auto-dialing paging receiver, the calling telephone number "03-123-4567" cannot be called by utilizing the auto-dialing operation while receiving such an information.

As previously described, in general, the radio paging system has been widely utilized as the business communication means between the office and workers outside their office. Also, the paging receiver equipped with the auto-dialing function and the dialing tone generating means is very useful because no hand dialing operation is required and a telephone call can be done based upon the received calling telephone number data.

However, when the callees who hold the paging receivers are out of their office, they have to use a public telephone line for communication purpose under these circumstances, they must pay the telephone fee by coins, which may cause a cumbersome operation, and also must prepare coins.

After the callees come back to their office, they adjust the total telephone fees, which may sometimes make unfair memory problems. To avoid such an unfair money problem, a prepaid card for making a telephone call may be previously distributed to callees. However, another unfair use of this prepaid card may be provided due to his private use thereof.

Furthermore, in the conventional auto-dialing apparatus, dialing numbers for a credit call are previously stored in a memory and a dialing tone is produced by combining the dialing number for the credit call with the telephone number selected from the telephone number memory during the dialing operation. However, in such a conventional auto-dialing apparatus, the credit call can be realized for all of the telephone numbers stored in the telephone number memory. As a consequence, in case that, for instance, an employer lends such an auto-dialing apparatus to an employee, abuse of the credit call may occur.

The present invention has been made in an attempt to solve the above-described various problems of the conventional auto-dialing type paging receivers and conventional auto-dialing apparatuses, and therefore has a primay object to provide a· radio paging receiver by which a telephone call can be made by way of a push tone telephone set to a callee defined by a calling telephone number which is represented in the received message information, even when the received message contains other data than the calling telephone number data, while calling callee based upon the received data.

Also, it is a secondary object of the invention to provide a paging receiver equipped with an auto-dialing function, capable of producing at a higher efficiency a dialing tone corresponding to a calling telephone number received by this paging receiver, as a part of message information, especially a parameter of a typical message phrase.

A third object of the present invention is to provide a paging receiver equipped with an auto-dialing function, capable of making an efficient telephone call to a predetermined callee based upon the received message information.

A fourth object of the present invention is to provide a paging receiver equipped with an auto-dialing function, capable of making an efficient telephoiine call to a callee designated by a caller in the recived information.

A fifth object of the present invention is to provide a paging receiver equipped with an auto-dialing function, capable of making a cashless telephone call when a telephone call is make to callee designated by a caller.

Further, a sixth object of the present invention is to provide a paging receiver equipped with an auto-dialing function, capable of making a cashless telephone call when a telephone call is made to a callee designated by a caller, and capable of preventing a private use of such a cashless telephone call.

In addition, a seventh object of the present invention is to provide a auto-dialing type paging reciever capable of making a cashless telephone call only to a callee who has been permitted by a caller for a telephone communication when a telephone call is made by receiving a message sent from the caller.

A still eighth object of the present invention is to provide an auto-dialing apparatus capable of making a cashless telephone call only when calling a callee previously determined.

SUMMARY OF THE INVENTION

The above-described objects and other features of the invention may be achieved by providing an auto-dialing paging receiver comprising: receiving means for receiving message data; storage means for storing the mesaage data received by the receiving means; readout means for reading out the message data from the storage means; display means for displaying the message data read out from the storage means; selection means for selecting a telephone number portion contained in the message data displayed on the display means; and dialing-tone generating means for converting the telephone number portion selected by the selection means into a corresponding dialing tone so as to output the dialing tone to a telephone handset.

BRIEF DESCRIPTION OF THE DRAWINGS

For a better understanding of the present invention, reference is made to the following descriptions in conjunction with the accompanying drawings, in which.

DETAILED DESCRIPTION OF THE PREFERRED EMBODIMENTS

Basic Idea of First Paging Receiver

To achieve the above-described first to third objects of the invention, a basic idea of a first paging receiver will now be summarized.

In the paging receiver equipped with the auto-dialing function according to the first preferred embodiment, there are provided a telephone number memory for storing a predetermined calling telephone number, and also a plurality of typical message phrase memories for storing a plurality of typical message phrases. When the message display mode is designated, the content of the typical message memory is read based upon the reduced mumber contained in the received message, and then displayed on the display unit. When the transmission key for instructing a generation of the dialing tone is operated, detection and discrimination are made to the reduced number contained in the selected message information. In this case, if a detected reduced number is the reduced number of the typical message phrase including the calling telephone number as a parameter contained in the selected message information, the calling telephone number is selected from the parameter data so as to be output to the dialing tone generating means. As s result, the auto-dialing operation can be performed even if other information is contained in the received message.

If a detected reduce number is the reduced number of the typical message phrase which requires a telephone calling to a predetermined callee, a predetermined calling telephone nember is read from the telephone number memory in accordance with this detected reduced number, whereby the dialing tone is produced based upon this read telephone number.

Construction of First Paging Receiver

Figure 1:
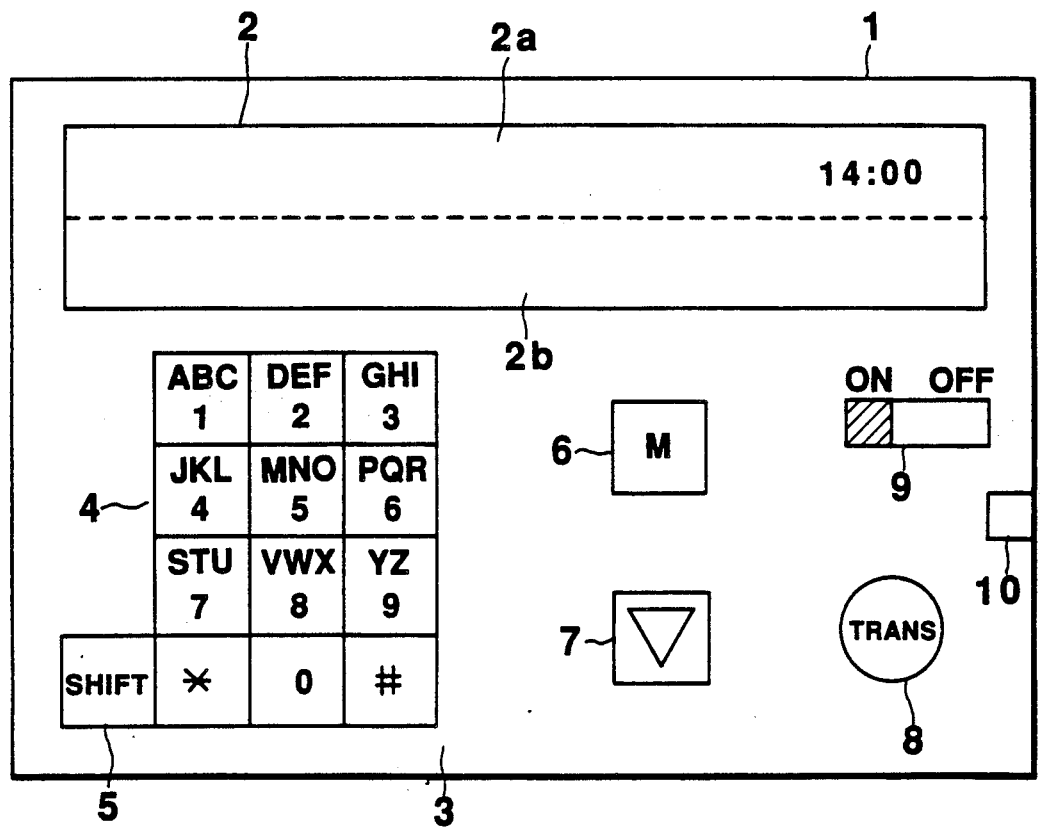
FIG. 1 is an outer view of a paging receiver according to a first preferred embodiment of the present invention.

In FIG. 1. there is shown an outer view of the first auto-dialing paging receiver so as to achieve the above-described first object of the invention based upon the above-mentioned basic idea.

In FIG. 1, a case 1 is employed in the first paging receiver. A display unit 2 constructed by employing, for instance, a liquid crystal element is provided in front of the case 1. This display unit 2 is arranged by an upper display area 2a and lower display area 2b, capable of displaying both a time and a message and the like. A keyboard 3 is provided on the front surface of this case 1 and under the display unit 2. On this keyboard 3, there are provided; numeral keys 4; a shift key 5 a mode key 6; a memory read key 7; a transmission key 8; a switch 9 for turning ON/OFF a paging function; and also an LED (light emitting diode) 10 for performing a calling announcement of the paging receiver.

In accordance with this numeral keys 4, both a numeral value and an alphabet can be input by a double function key by way of utilizing a shift key 5 to changing the input data sort. Functions of the mode key 6 are sequentially designate foru modes; 1) a clock mode, 2) a message display mode, 3) a telephone number display mode; and 4) a telephone number write mode. Functions of the memory read key 7 are to first designate an address of an internal memory, and to secondly sequentially read either messaage information which has been received and stored in this internal memory, or a name which has also been registered therein, together with the corresponding telephone number. This memory read key 7 is used as an address designation key while writing a telephone number into the memory. The transmission key 8 is to commence a transmission of a designated telephone number by way of a dialing tone. A function of the paging fuction ON/OFF switch 9 is to turn ON/OFF only the reception function of the message.

There are four display modes in the above-described display unit 2 by operating the mode key 6.

1) A present time is displayed on the upper display area 2a of the display unit 2 in case that the clock mode is designated by the mode key 6.

2) A reception time of a message is displayed on the upper display area 2a; and a read number for the memory, the information on calling sort, and a received message are displayed on the lower display area 2b when the message display mode is designated.

3) The name read out from the memory is displayed on the upper display area 2a, and the registered telephone number read from the memory is displayed on the lower display area 2b when the telephone number display mode is designated.

4) A name input by the numerical keys 4 is displayed on the upper display area 2a, and the telephone number input by the numerical keys 4 is displayed on the lower display area 2b when the telephone number write mode is designated.

Circuit Arrangement of Paging Receiver

An electronic circuit of the first paging receiver, stored in the above-described case 1 will now be described with reference to FIG. 2. In the circuit shown in FIG. 2. an antenna 11 is employed to receive radio signals transmitted from a radio communication station of a paging service firm, and supplies the received radio signals to a receiver unit 12. As the radio signals output from the radio communication station of the paging service firm, for instance, an FM (frequency modulated) wave of 280 MHz is utilized. This FM wave has been modulated in the known FSK-NRZ (Frequency Shift Keying - Non Return to Zero) signal system, and contains various information at a bit rate of 512 bits/sec. This receiver unit 12 is arranged by a selection circuit for selecting the radio signal having 280 MHz, and a demodulation circuit for demodulating the FSK-NRZ signal (not shown in detail). The FSK-NRZ signal is demodulated to obtain "0" and "1" signals, which ae then output to a decoder unit 13. An ID-ROM (identification code-read only memory) 14 for previously storing a self-identification code is connected to the decoder unit 13. The decoder unit 13 decodes the data received from the receiver unit 12 by way of, for instance, a "POCSAG" system, in order to judge whether or not the decoded data corresponds to the calling number for the caller with reference to the ID code derived from ID-ROM 14. Then, the decoder unit 13 outputs to CPU (central processing unit) 15, a reception fetch instruction for receiving the information on calling sort attached to the caller's calling number and the message data subsequent to the caller's calling number. To CPU 5, a key input unit 16, RAM17, a typical message phrase memory 18 and character generator 19 are connected, and also the above-described display unit 2 is connected via a display buffer 20. The function of the key input unit 16 is to input a signal corresponding to each operation of various keys provided on the keyboard 3, into CUP 15. RAM 17 stores a meassage sent from a caller, and also stores a plurality of telephone numbers which are entered by the numeral keys 4 (will be discussed in detail). In the typical message phrase memory 18, various typical message phases corresponding to a table 1 are previously set.

TABLE 1

Reduced Numbers Typical Message Phrases

01—Call to the following telephone number.
02—Urgently call the following telephone number.
03—Call to the following telephone number at the following time.
04—Urgent call.
05—Call at your convenience.
06—Report present conditions.
07—Return until the following time.
08—Go to the place in question.

An LED drive unit 21, a sound signal generating unit 22, DTMF (dual tone multi-frequency) signal generating unit 23, and a buffer 24 for temporarily storing dial data are connected to CPU 15. The LED 10 is connected to the LED driving unit 21 whereas a speaker 25 is connected to the sound signal generating unit 22 and DTMF signal generating unit 23. This speaker 25 is provided, for instance, on a rear side of the case 1. The function of the sound signal generating unit 22 is to drive the speaker 25 in response to an instruction derived from CPU 15 while receiving a self calling number, thereby announcing a call. The function of the DTMF signal generating unit 23 is to generate a DTMF (dual tone multi-frequency) signal based upon the dial data which has been set in the buffer 24, and then drive the speaker 25 for producing a dialing tone. After dialing operation, an end signal is sent from the DTMF signal generating unit 23 to CPU 15.

While receiving the message sent from the caller, CPU 15 supplies this message to RAM 17 for storage purpose and judges whether or not the typical message phrase code is contained in the message. If there is the typical message phrase code in the received message, a designation is made to address the address of the typical message phrase memory 18 based upon the reduced number subsequent to the phrase code. Then, the content of this phrase memory 18 is read, whereby a character pattern corresponding to this content is produced from the character generator 19, and the produced character pattern is output to the display buffer 20 so as to be displayed on the display unit 2. Then, when the transmission key 8 is operated, a detection is made to a predetermined reduced number of the typical message phrase contained in the message information which has been selected and designated. As a result, the calling telephone number subsequent to this reduced number is output to the buffer 24 and thus, the dialing (multifrequency) tone is produced from the DTMF signal generating unit 23.

DATA FORMAT OF POCSAG SYSTEM

A POCSAG system which has been introduced in the paging receiver according to the preferred embodiment, will now be summarized.

FIGS. 3A to 3D illustrate data formats of this POCSAG system.

Figure 3A:
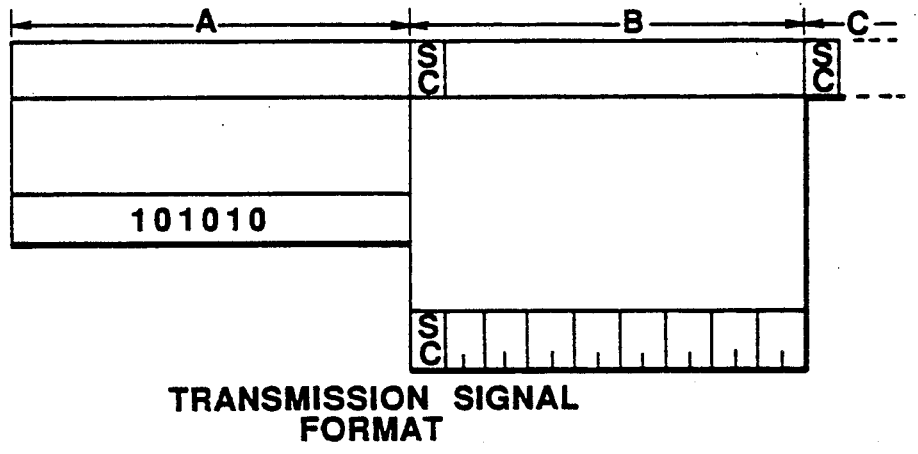
FIG. 3A to 3D illustrate data formats of POCSAG method employed in the paging receiver represented in FIG. 1.

FIG. 3A represents an overall transmission signal format.

In the POCSAG system, the transmission signal is arranged by a preamble signal "A" in which bit data having 576 bits are sequentially continued in a form of 101010, and by plurality of batch signals B, C, ---succeeding to the preamble signal. The function of the preamble signal is to enable the paging receiver to recognize that data will be sent thereto, and also to establish a bit synchronization. Therefore, the decoder unit 13 detects the preamble signal to prepare for receiving the batch data which will be sent succeeding to the preamble signal.

Figure 3B:
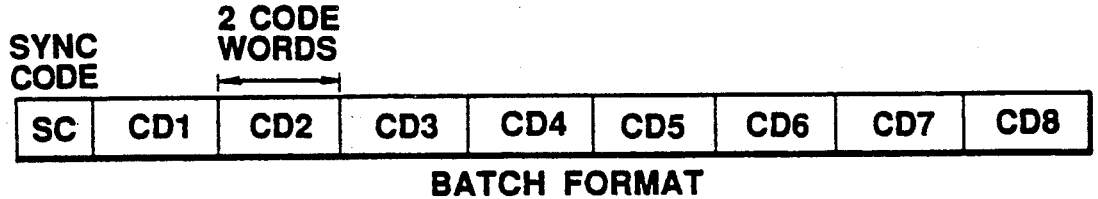

FIG. 3B illustrates a batch format of the above-described patch data. This batch format is constructed of a sync (synchronization) code "SC" having 1 word, first, and 8 frames CD1 to CD8 each constructed of 2 word codes, subsequently. Each of code words is arranged by 32 bits. This word includes an address code word and a message code word.

Figure 3C:
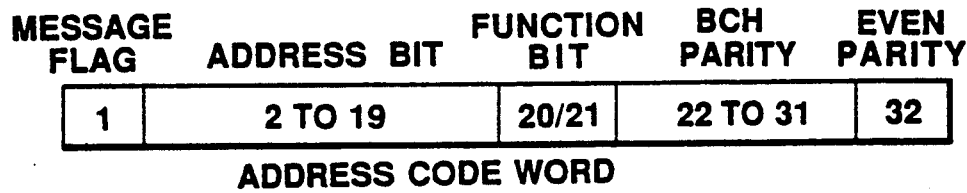
Figure 3D:
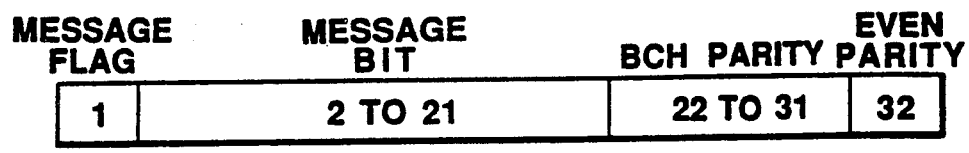

FIGS. 3C and 3D represent arrangements of the address code word and message code word. FIG. 3C represents the address code word, in which a message flag is provided at a head portion thereof, an address code is provided subsequent to the message flag, and thereafter function bits, BCH parity bits and an even parity bit are succeeded.

The function of this message flag is to discriminate the address code word from the message code word, which will be sent subsequent to this message code. If the message flag indicates "0", the address code word is sent, whereas if the message flag indicates "1", the message code word is delivered. Second to nineteenth bit after the message flag corresponds to the address bit. The 18-bit data corresponds to the above-described calling number. Furthermore, 2-bit function bit is provided after this 18-bit data. The 2-bit-function bit is employed so as to represent the display condition and announcement condition. There are four different functions "00", "01", "10" and "11". This function information is used to identify a caller.

In the digital radio paging system, errors may be caused in the received data. In the specific case that the bad reception condition is present, the demodulation of the FSK signal is incomplete and thus, an error may occur. To correct the error contained in the received data, the BCH parity having 22 to 31 bits is employed in the POCSAG system. Thereafter, the even parity pit is provided. The function of this even parity is to represent that a total number of "1" contained from the head bit to the last bit corresponds to an even number, of an odd number.

FIG. 3D represents the message code word. In this code word, the message bits are added after the message flag. This implies that a message sent by a caller is added, for instance, a telephone number and other information. Similarly, the message code word is constructed by each data of the BCH parity and even parity in the same code word.

Memory Regions of RAM

Figure 2:
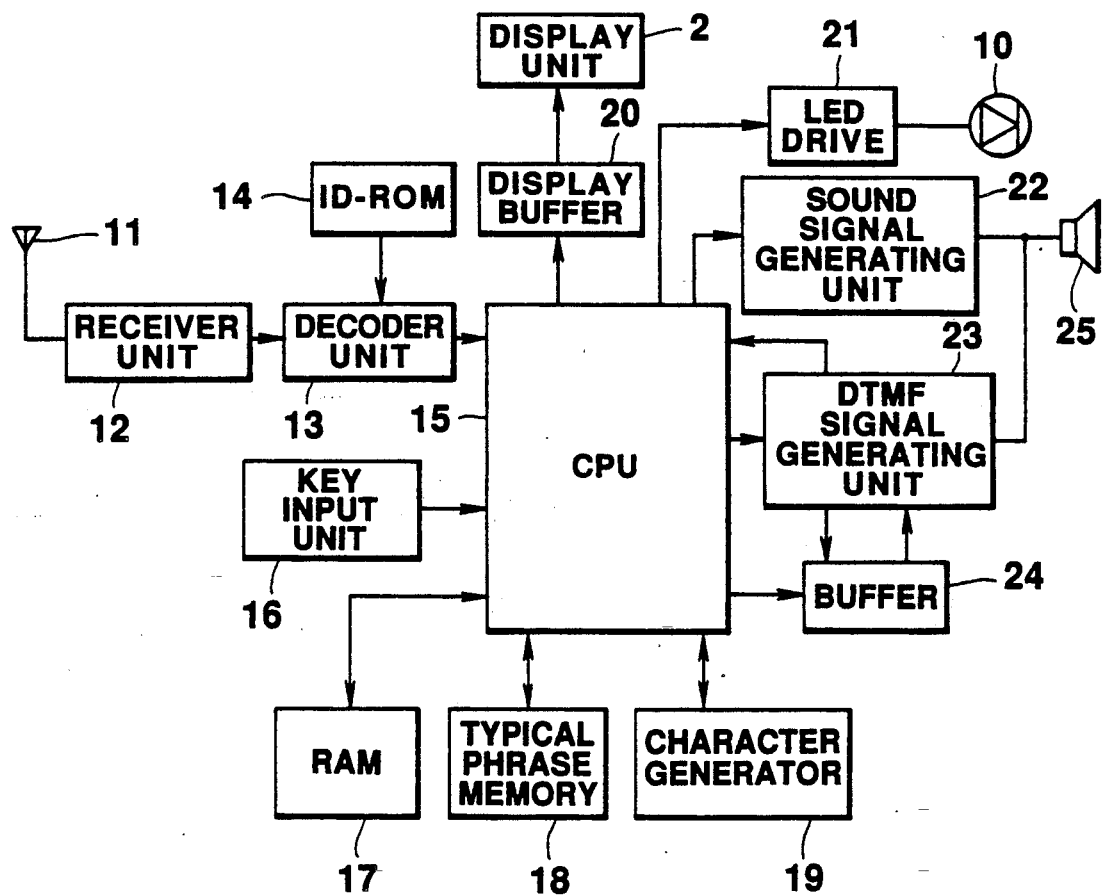
FIG. 2 is a schematic block diagram of an electronic circuit of the paging receiver shown in FIG. 1.
Figure 4:
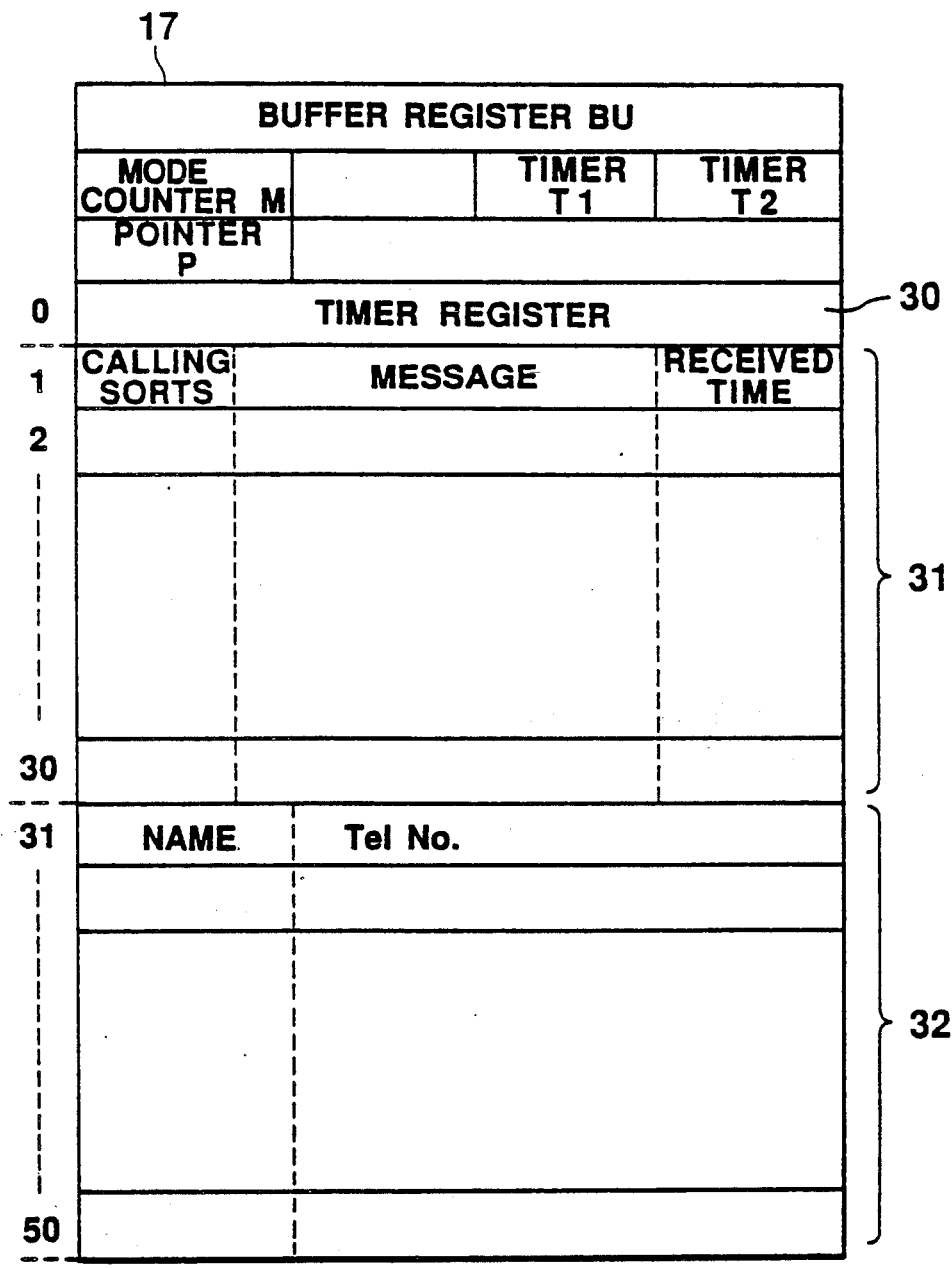
FIG. 4 schematically illustrates memory regions of RAM 17 shown in FIG. 2.

FIG. 4 illustrates a detailed memory regions of RAM 17 employed in the electronic circuit of the paging receiver shown in FIGS. 1 and 2. This RAM 17 is arranged by: a buffer register "BU" for temporarily storing the received message: a mode counter "M" for designating the mode; timers T1 and T2; a pointer "P" for designating an address of a specific area within RAM 17; a timer register 30; an FIFO type message register unit 31 for temporarily storing the received message; and a telephone number memory unit 32 for storing the telephone number entered by the key input unit 16. The functions of the mode counter M are as follows. When the count value is equal to "0", the clock mode is selected. When the count value is equal to "1", the message display mode is designated. When the count value is equal to "2", the telephone number display mode is selected. When the count value is equal to "3", the telephone number write mode is designated. The pointer "P" is used to designate addresses of the above-described timer register 30, message register unit 31, and telephone number memory 32. The first timer $T_1$ controls the announcing time period for LED 10 and speaker 25 when the call is made. For instance, this timer $T_1$ measures whether or not 8 seconds have passed since the calling signal is received. To the contrary, the second timer $T_2$ controls the display time period for the received message when the calling signal is received, and, for instance, checks whether or not 30 seconds have passed since the calling signal is received. The function of the timer register 30 is to measure a present time. This timer register 30 is provided at an address (relative address) of "0". Further, the message register unit 31 is provided at addresses of "1" to "30", and stores both the information on calling sort and received time data together with the received message at the respective addresses. The message register unit 31 is of an FIFO (first-in first-out) type buffer. When the received message once stored in the buffer register is written at the address "1" of the register, the information stored in the respective registers are successively shifted to the next addresses of the register, and thus the message held at the last address of 30 of the register is push out and disappears from this message register unit 31. In this case, each of the addresses of the above-described timer register 30, message register unit 31, and telephone number memory unit 32 is designated by the pointer "P".

Overall Operation of First Paging Receiver

Figure 5:
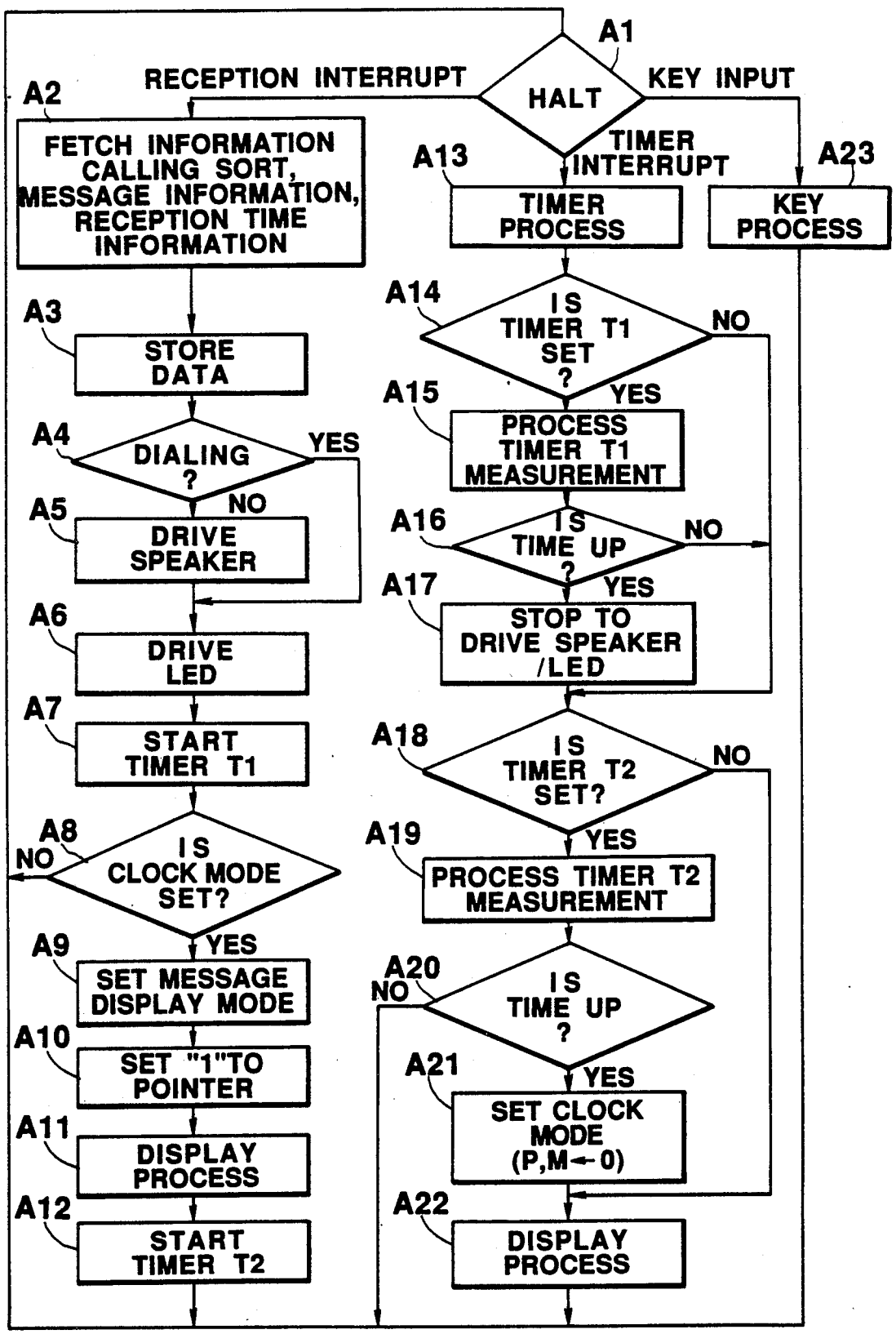
FIGS. 5 to 8 are flowcharts for explaining operations of the first paging receiver shown in FIG. 1.

An overall operation of the paging receiver according to the first preferred embodiment of the invention will now be described with reference to the circuit diagram of FIG. 2 and also a flowchart of FIG. 5.

CPU 15 performs the following three process operations; 1) When a call is made by a caller; 2) When a timer operation is executed; and 3) when a key operation is carried out. Assuming that a telephone call made by a caller is received by the receiver unit 12, and this telephone call corresponds to a telephone number for calling this paging receiver itself, the reception fetch instruction is sent from the decoder unit 13 to CPU 15. Then, a reception interruption is produced. CPU 15 advances the processing operation from a HALT condition defined at a step A1 to a next step A2, as represented in FIG. 5. At this step A2, the information on calling sort (as previously described, function bit information), and message information which are attached to the calling number are fetched and the reception time information (i.e., the contents of the timer register 30) is fetched to be temporarily stored into the buffer register "BU" in RAM 17. After the information has been fetched into the buffer register "BU", this information is transferred to the message register unit 31 to be stored in the address of 1 (step A3). In this case, if other information has been held at the respective addresses of the message register unit 31, this information is sequentially shifted to the subsequent address prior to the new data fetch. That is to say, the latest received information is always written and held at the address of "1" of the message register unit 31. In case that the received message corresponds to the telephone number, this message information corresponds to, for instance, "03D123D4567". This message information is stored in the message register unit 31 of RAM 17 in this present form. The above-described "D" corresponds to a hyphen code of 4 bits "1101". If the message is such a typical message phrase "Call the following telephone number "03-123-4567", the sent message information corresponds to, for instance, "FF0103D123D4567", which will be stored into the message register unit 31 in this present form. The symbol "F" added to the head of the above-described message corresponds to the 4-bit left brace code "1111", and the double brace represents that the received message corresponds to the typical message phrase. The subsequent two digits corresponds to the reduced number, and the remaining eleven digits corresponds to the telephone number in question. Thereafter, a judgement is made whether or not a dialing operation is performed at a step A4. In other words, a check is made whether or not a dialing operation effected by the DTMF signal generating unit 23 is performed (step A4). If no dialing operation is carried out, an operation instruction is sent from CPU 15 to the sound signal generating unit 22 and thus the speaker 25 is driven at a predetermined frequency, whereby a sound announcement of calling reception is accomplished (step A5). Furthermore, another drive instruction is sent from CPU 15 to the LED drive unit 21 so as to turn ON LED 10, whereby a lighting announcement of calling reception is accomplished (step A6). In this case, to the contrary, if a dialing operation is executed, no speaker 25 is driven, but only LED 20 is driven for the lighting announcement of calling reception. At this time, the timer "T1" is set which is provided within RAM 17 so as to control the announcing time (step A7).

Thereafter, a check is made whether or not the set mode made at this time corresponds to the clock mode. In other words, a judgement is effected whether or not the count value of the mode counter "M" in RAM 17 is equal to "0(zero)" (step A8). If the clock mode is not set, then the process is returned directly to the precious step A1 of "HALT" condition.

When the clock mode is designated, the count value of the mode counter M is incremented by 1, so that the message display mode is set (step A9) and also "1" is set to the pointer "P" (step A10). Under this condition, CPU 15 reads the content of the address "1" in the message register unit 31 designated by the pointer "P", and then outputs the read content to the display buffer 20 for displaying the content at the display unit 2 (step A11). In this case, the message received time is displayed at the upper display area 2a of the display unit 2, and both the information on calling sort and message are displayed on the lower display area 2b thereof. When the message which has been stored in the message register unit 31 is displayed on the display unit 2, a check is made whether or not the typical message phrase code "FF" is contained in the received message information. If no typical message phrase code is contained, the received message information is directly converted into corresponding character data by way of the character generator 19. The character data is supplied via the display buffer 20 to the display unit 2 for display purposes. As previously described, in case that the received message corresponds to the telephone number "03D123D4567", the display content is "03-123-4567". To the contrary, in case that the typical message phrase code is contained in the received message information such as "FF0103D123D4567", the address of the typical message phase memory 18 is designated based upon the two-digit data "01" succeeding to the typical message phrase code "FF", whereby the corresponding typical message phase "Call to the following telephone number" is read out from this memory 18. The readout typical message phrase is converted into the corresponding character data by the character generator 19, and thereafter displayed via the display buffer 20 on the display unit 2. As a result, the display content is "Call to the following telephone number, 03-123-4567".

While performing the above-described display process, the second timer T2 for controlling the message display time is set (step A12), and thereafter the process is returned to the "HALT" condition of the step A1.

Under this condition, when a timer interrupt is produced, the process advances to a step A13 where the timer process is performed. This timer interrupt is produced for, e.g., 1 second interval. At a result, the timer information within the timer register 30 is incremented by 1. Then, a judgement is made whether or not the first timer T1 has been set (step A14). When the first timer T1 is set, the count value of this timer T1 is incremented by 1 (step A15), and thereafter a further judgement is made whether or not the time measuring value of this timer T1 reaches a preset value, e.g., 8 seconds in the preferred embodiment (step A16). If the measuring value does not yet reach 8 seconds, another judgement is made whether or not the second timer T2 has been set (step A18). To the contrary, when the measuring value reached 8 seconds, the sound announcement and the lighting announcement are stopped (step A17), and thereafter the process is advanced to the previous step A18. When a judgement is made that the timer T1 is not set in the step A14, no time measurement by the timer T1 is carried out and the process is advanced to the previous step A18 where another judgement is performed whether or not the second timer T2 is brought into the set condition. When the second timer T2 is set, the count value of this timer T2 is incremented by 1 (step A19), and thereafter a further judgement is made whether or not this count value reaches another present value, e.g., 30 seconds in the preferred embodiment (step A20). If not yet reach 30 seconds, the process is returned to the "HALT" condition of the step A1.

The above-described timer interrupt process is repeatedly execute every a predetermined time period. As a result of such timer interrupt process, when the first timer T1 is brought into the time-up condition, namely 8 seconds have elapsed, then the drive stop instruction is sent from CPU 15 to the LED drive unit 21 and sound signal generating unit 22, whereby both the lighting and sound announcements by the LED 10 and speaker 25 are interrupted. Furthermore, when the second timer T2 is brought into the timer-up condition, namely 30 second timer T2 is brought into the timer-up condition, namely 30 seconds have passed, "0" is set from CPU 15 to the mode counter M so that the clock mode is designated and also "0" is set to the pointer "P". When "0" is set to this pointer "P", the present time information stored at the address of "0" is read out from the timer register 30 via CPU 15 and transferred to the display buffer 20 via CPU 15 and the character generator 19. As a result, this present time information is displayed on the upper display area 2a of the display unit 2 (step A22) as represented in FIG. 1. To the contrary, when the second timer T2 is not yet set, the process is directly advanced from the step A18 to the step A22, whereby the above-explained present time information is displayed.

As previously described, in the auto-dialing paging receiver according to the first preferred embodiment, when a call is made, the announcements by LED 10 and speaker 25 for reporting a call are performed for 8 seconds, and the received message is displayed on the display unit 2 for 30 seconds. Thereafter, the process is returned to the normal clock mode and the present time is displayed.

Various Key Processing Operation

When a key operation signal derived from the key input unit 16 shown in FIG. 2 is input into CPU 15, the process advances from the "HALT" condition of the step A1 to a further step A23, whereby a key process is executed.

Figure 6:
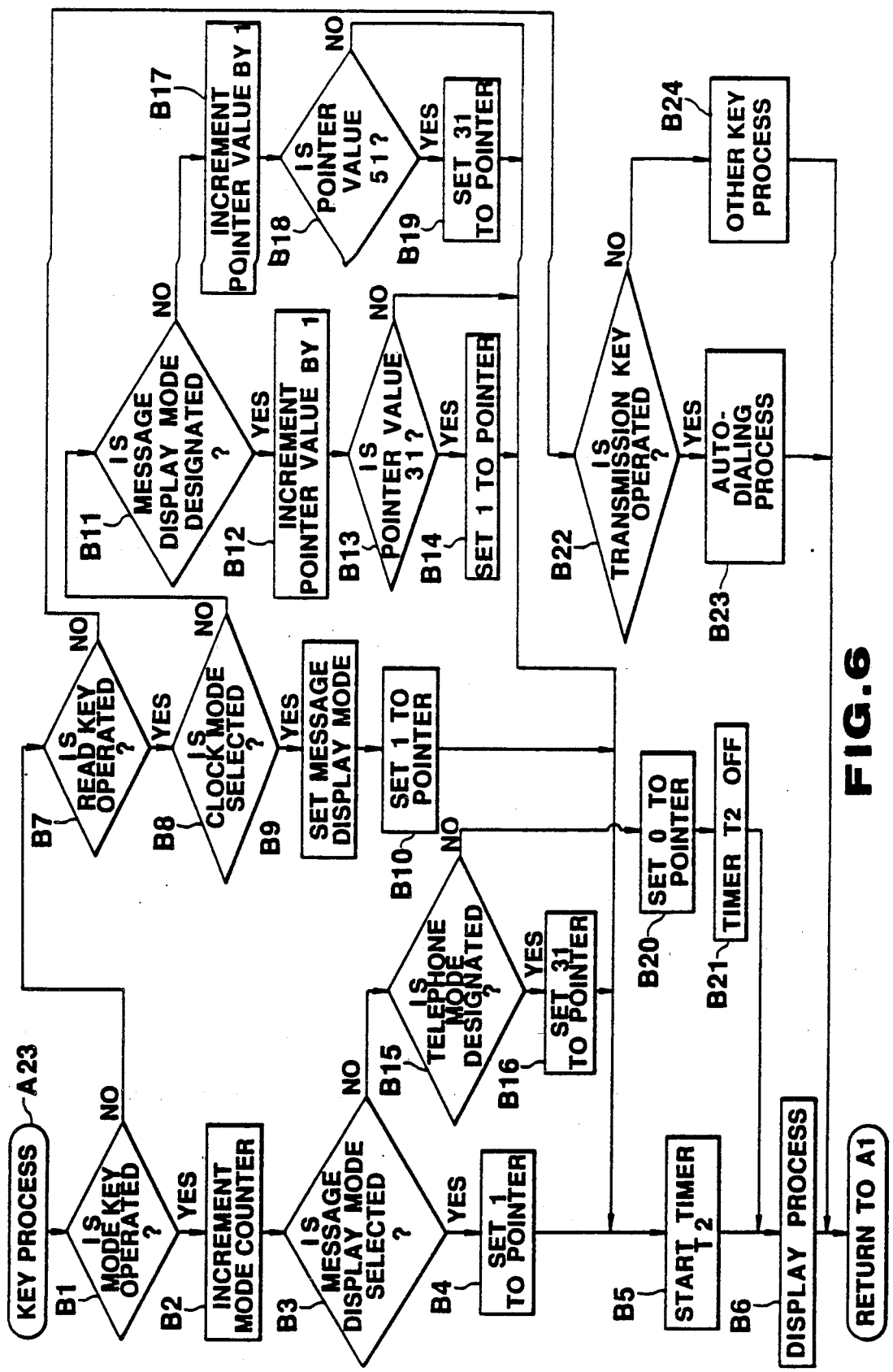

Referring now to a flowchart shown in FIG. 6, this key process will be described in detail. To display on the display unit 2 the message information stored in the message register unit 31 within RAM 17, the message display mode is designated by the mode key 6, or the read key 7 is operated in the clock mode.

When the key operation is performed under this condition, a judgement is made whether or not the operated key corresponds to the mode key 6 at a step B1. If the mode key 6 is operated, after the count value of the mode counter M is incremented by 1 (step B2), another check is made whether or not the message display mode (mode counter M=1) is selected (step B3). If the message display mode is selected, then "1" is set to the pointer "P" (step B4) and simultaneously the time measuring operation by the second timer T2 is commenced (step B5). Then, the information stored at the address which has been designated by the pointer "P", namely the memory information at the address "1" in this case, i.e., the information on calling sort, message, and received time are read out and displayed on the display unit 2 (step B6). In other words, when the message display mode is designated by the mode key 6, the newest message information which has been finally stored at the address of 1 in the message register unit 31 is displayed on the display unit 2.

When the read key 7 is operated in the clock mode, the process is advanced from the step B1 to a step B7, and a judgement is made whether or not the operated key corresponds to the read key 7. In this case, since the read key 7 is operated, another judgement is performed whether or not the clock mode (M=0) is selected in a further step B8. Since at this time, the clock mode has been designated, the content of the mode counter "M" is incremented by 1, the message display mode is designated (step B9) and also "1" is set to the pointer "P" (step B10). Thereafter, the process advances via the above-described step B5 (i.e., to start the timer T2) to the step B6, and as a previously described, the message information which has been stored at the address of 1 in the message register unit 31 is displayed on the display unit 2.

When the subsequent message is displayed under such a condition that the above-described message information is being displayed, then the read key 7 is operated. When this read key 7 is operated, the process advances to a step B11 via the steps B1, B7 and B8, in which a judgement is made whether or not the message display mode is designated. In this case, as previously explained, since the message display mode has been designated, the pointer "P" is incremented by 1 (step B12) and thereafter, whether the incremented value thereof reaches 31 is checked (step B13). If the value of the pointer "P" does not yet reach 31, the process advances via the step B5 to the step B6 in which the above-described message is processed. In the words, the information stored in the message register unit 31 which is designated by the value of the pointer "P" is read out and then displayed on the display unit 2. Similarly, every time the read key 7 is operated, the value of the pointer "P" is incremented by 1, the designated address for the message register unit 31 is updated, the message information stored in the message register unit 31 is successively read to be displayed on the display unit 2. When the value of the pointer "P" by operating the read key 7 exceeds over the final address (i.e., address of 30) of the message register unit 31, this condition is detected at a step B13. Then, "1" is set to the pointer "P" in the subsequent step B14. As a result, the designated address of the message register unit 31 is returned to the first address of "1" and the information stored at this address is displayed on the display unit 2. As previously described, the various information stored in the message register unit 31 is sequentially displayed on the display unit 2 by operating the read key 7. In such a specific case that no key is operated under this message display condition, when the time measurement by the second timer T2 is performed for 30 seconds, the process is returned to the clock mode.

When the telephone number stored in the telephone number memory 32 of RAM 17 is displayed on the display unit 2, the telephone number display mode is designated by the mode key 6. When the mode key 6 is operated to designate the telephone number display mode, the process advances via the steps B1, and B2 to the step B3, in which a judgement is made whether or not the message display mode is designated. In this case, since the telephone number display mode has been designated, the judgement result of the step B3 is "NO". Then, the process is advanced to a step B15, in which a judgement is made whether or not the telephone number display mode or telephone number write mode is designated. When the telephone number display mode, or telephone number write mode is designated, "31" is set to the pointer "P". Thereafter, the process advances from the step B5 to the step B6 so that the display process is performed. In other words, when the address of "31" of the telephone number memory unit 32 is designated by the pointer "P", the name and telephone number which have been stored at this address of 31 are read out via CPU 15 and the character generator 19 to the display buffer 20, so that the name is displayed on the upper display area 2a on the display unit 2, whereas the telephone number is displayed on the lower display area 2b thereof.

Then, when other telephone number which has been stored in the telephone number memory unit 32 is read out so as to be displayed on the display unit 2, the read key 7 is operated under this condition. When this read key 7 is operated, the process advances via the steps B1, B7, and B8 to the step B11, in which a judgement is made whether or not the message display mode is designated. In this case, since the message display mode is not designated, a judgement result becomes "NO" and then the process advances to a step B17. Then, the value of the pointer "P" is incremented by 1. Thereafter, a check is made whether or not the incremented value of the pointer "P" reaches "51", namely whether or not the value of the pointer "P" exceeds over the last address of the telephone number memory 32. If not exceeds over the last address, the process advances via the step B5 to the step B6. In this step B6, the information stored in the telephone number memory unit 32 which is designated by the value of the pointer "P", is read and displayed on the display unit 2. As previously described, in this telephone number display mode, the value of the pointer is incremented by 1 every time the read key 7 is operated, and both the name and telephone number which have been stored in the telephone number memory unit 32 are sequentially read so as to be displayed on the display unit 2. If the value of the pointer "P" exceeds over the last address (i.e., address of 50) of the telephone number memory unit 32 and reaches the address of 51 while operating the read key 7, this condition is detected in a step B18. Then, "31" is set to the value of the pointer "P" in the next step B19. As a result, the address designation of the telephone number memory unit 32 is returned to the first address, and thus the information stored at this address is read to be displayed on the display unit 2.

Also in the telephone number write mode, the information stored in the telephone number memory unit 32 is displayed on the display unit 2, which is similar to the telephone number display mode. In accordance with this telephone number write mode, after the displayed content is corrected or rewritten by operating the numeral key 4, the resultant content may be written into the corresponding address of the telephone number memory unit 32. A key process for setting this telephone number is carried out at a step B28 (will be discussed later).

When the mode key 6 is operated to change either the message display mode or telephone number display mode into the clock mode, the judgement results in the steps B3 and B15 become "NO", and the process advances to a step B20 in which "0" is set to the value of the pointer "P". Thereafter the second timer T2 is turned off (step B21), and the process is returned to the display process defined by the previous step B6. As a result, the address of "0" of the timer register 30 is designated by the pointer "P", and the timer information stored at the address of "0" is read out to the display buffer 18 and then displayed on the display unit 2.

In case of the auto-dialing operation, either the message display mode or telephone display mode is designated and the transmission key 8 is operated under the condition that a telephone number to be called is displayed on the display unit 2. When this transmission key 8 is manipulated, the judgement results of the steps B1 and B7 in the flowchart shown in FIG. 6 are both "NO", and then the process advances to a step B22, in which a judgement is made whether or not the transmission key 8 is operated. If the transmission key 8 is operated, an auto-dialing operation is carried out in step B23. This auto-dialing operation will be discussed later in detail. When the numeral keys 4, shift key 5, and the like are operated in case of the telephone number setting operation, the judgement results defined in the steps B1, B7, and B22 are "NO", then the process advances to a step B24, in which a further key process is executed.

Auto-Dialing Process

Figure 7:
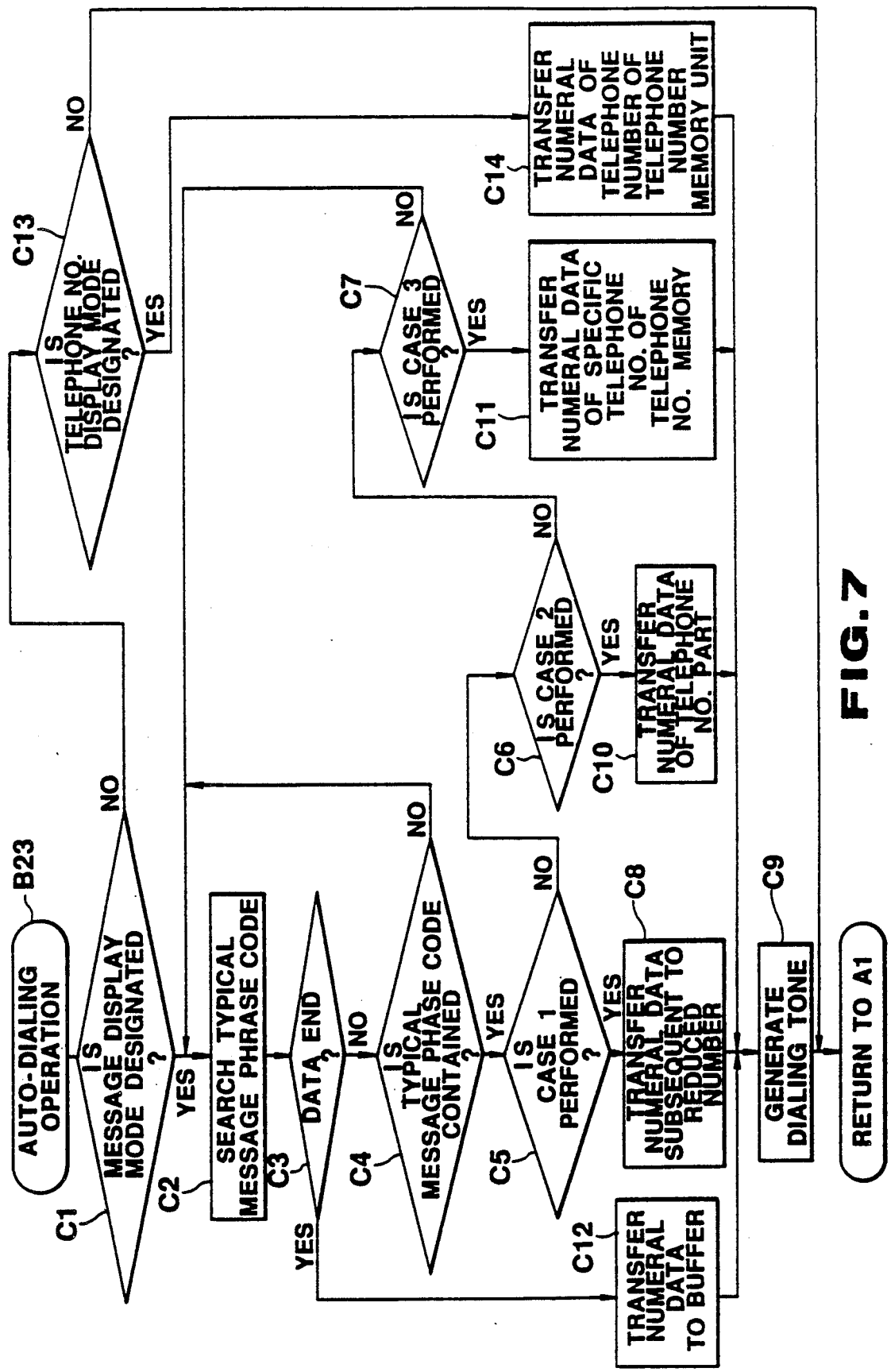
Figure 8:
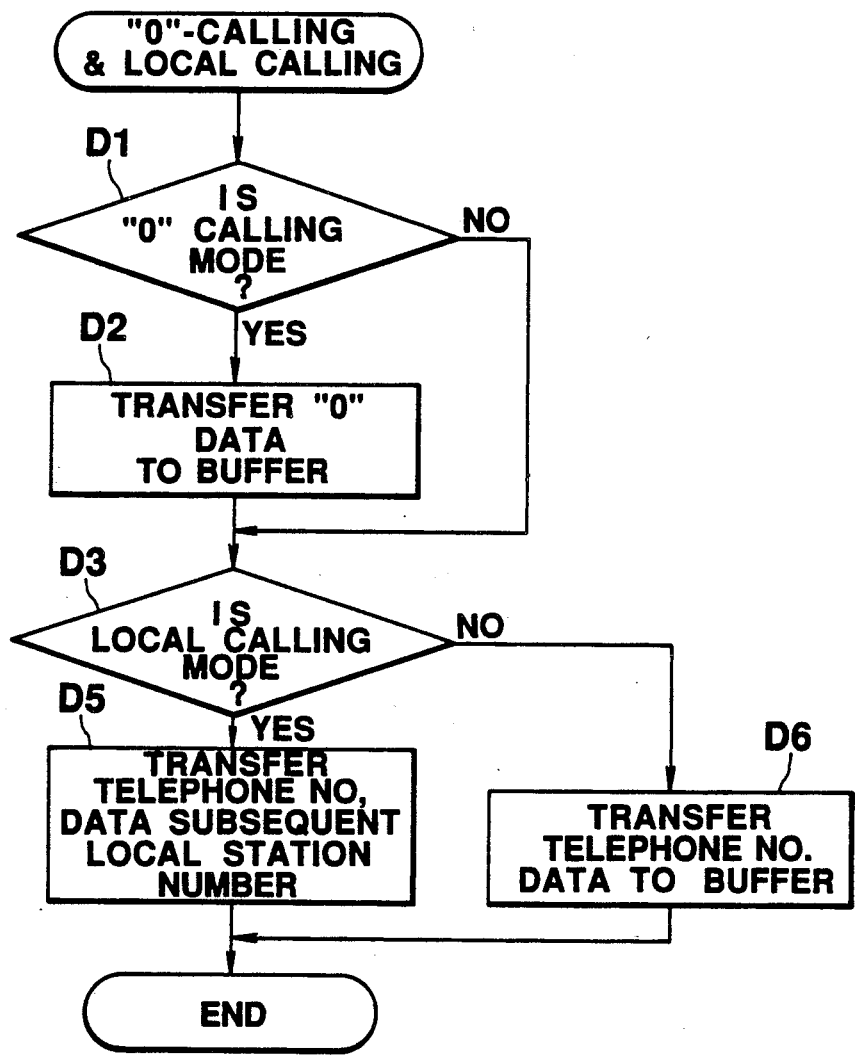

A detailed operation of the above-described auto-dialing operation as defined in the step B23 will now be described with reference to a flowchart shown in FIG. 7.

At a first step C1, a judgement is made whether or not the message display mode is designated. If yes, then a search is carried out from the head data whether or not the above-described typical message phrase code "FF" is contained in the message information which is read from the message register section 31 of RAM 17 to CPU 15 (step C2). In this time, a check is made whether or not the searched digit data reaches a data end (step C3). Thereafter, another check is made whether or not the typical message phrase code is present (step C4). If no, then the auto-dialing process is returned to the previous step C2, thereby to continue the search on the typical message phrase code. When the typical message phrase code is detected in the above step C4, the following discrimination process is successively performed with respect to the typical message phase which is designated based upon two-digit values (i.e., reduced number for typical message phrase).

1) A judgement is made whether or not the parameter corresponds to only the telephone number. Otherwise, a check is made whether or not the first parameter corresponds to the typical message phrase as the telephone number (step C5).

2) A judgement is performed whether or not the second and succeeding parameters corresponds to the typical message phrases as the telephone numbers (step C6).

3) A judgement is carried out whether or not the typical message phrase for demanding a telephone call, although the telephone number is not contained as the parameter (step C7). If a judgement result of the above step C5 is "YES" (namely, in case of the typical message phase defined by a case 1), the following process is effected. That is, since the typical message phrase corresponds to the reduced numbers "01" and "02" as listed in table 1, the numeral data (except for such data "D" representing a symbol, e.g., hyphen), the numerical data subsequent to the reduced number contained in the message information is transferred to the buffer 24 (step C8). Thereafter, an operation instruction is supplied to the DTMF signal generating unit 23. As a result, the DTMF signal generating unit 23 is operated to thereby produce the DTMF (dual tone multi-frequency) signal in accordance with the telephone number which has been set into the buffer 24, whereby the speaker 25 is driven (step C9). Upon completion of the dialing operation, the DTMF signal generating unit 23 outputs an end signal to CPU 15.

If the judgement result of the above-described step C6 becomes YES (namely, the typical message phrase of a case 2 is designated), the following process is performed. That is, since the reduced number of the typical message phrase corresponds to the reduced number "03" as represented in table 1, the numerical data of the telephone number part among the data subsequent to the reduced number of the typical message phase is transferred to the buffer 24 (step C10). Then, the process advances to the step C9 in which the dialing tone is generated based upon the data held in the buffer 24. It should be noted that the above-described judgement on the telephone number part contained in the message information can be done as follows. Since it is decided that the telephone number corresponds to a predetermined parameter based upon the respective typical message phrases, and also a segment code, for instance, a space code (1100) is inserted into each of the parameters, such a judgement can be executed based upon this segment code.

Furthermore, when the judgement result of the above step C7 is YES, then the following process is performed (namely, the typical message phrase of a case 3). That is, the reduced number of the typical message phrase corresponds to the reduced numbers "04" to "06" as listed in table 1. After the numeral data of the specific telephone number stored in the telephone number memory 32 is transferred to the buffer 24 (step C11), the process advances to the step C9 in which the dialing tone is produced based upon the data held at a specific address, e.g., a head address of 31 of the buffer 24. The above-described reduced numbers are typically telephone numbers used in an own firm.

If there is no typical message phrase corresponding to the above cases 1) to 3) in the message information, since message information per se normally corresponds to a calling telephone number, the process is returned from the step C7 to step C2. In the next step C3, after the data end is detected, the process advances to the step C12 in which the numeral data contained in the message information is transferred to the buffer 24, and therefore the dialing tone is produced from the DTMF signal generating unit 23 (step C9).

In the above-described step C1, when the message display mode is not designated, a further judgement is made whether or not the telephone number display mode is designated (step C13). If the telephone number display mode is designated, the numeral data corresponding to the selected telephone number which has been stored in the telephone number memory 32 is transferred to the buffer 24 (step C14), and subsequently the process advances to the step C9, whereby the dialing tone is produced based upon the data held in this buffer 24. Also, if the telephone number display mode is not designated, the auto-dialing process is directly returned to the step A1 shown in FIG. 5.

Calling Mode Process

The dialing data transfer process during the above-described auto-dialing operation will now be described, in which the calling modes, e.g., "0-calling (external telephone calling)" and "local calling". That is, processes as defined in steps C6, C10, C11, C12 and C14 are performed as shown in FIG. 7. First, a judgement is made whether or not the "0-calling" mode is selected (step D1). If yes, then the 0-data is transferred to the buffer 24 (step D2) and thereafter another judgement is made whether or not the local calling mode is selected (step D3). If the "0-calling" mode is not selected in the step D1, the judgement operation defined by the step D3 is immediately performed. Then, if the local calling mode is selected in the step D3, the telephone number part subsequent to the local calling station number is transferred to the buffer 24 so that the dialing tone is produced. In this case, the local calling station number is selected by detecting the station number segment code (for instance, hyphen code: 1101). In this step D3, when the local calling mode is not designated, all digit numbers of the telephone number are transferred to the buffer 24 thereby to produce the dialing tone.

Both the "0-calling" mode and "local-calling" mode are performed as described above.

While has been described in detail, in accordance with the auto-dialing type paging receiver of the fifth preferred embodiment, there are provided the telephone number memory for storing a predetermined calling telephone number, and also a plurality of typical message phrase memories for storing a plurality of typical message phrases. When the transmission key for instructing generation of the dialing tone is operated, the detection and the discrimination in are made to the reduced number contained in the selected message information. If a detected reduced number is the reduced number of the typical message phrase including the calling telephone number as a parameter contained in the selected message information, a judgement is effected which part of the parameter data corresponds to the calling telephone number in accordance with this detected reduced number. As a consequence, even if the information such as the designated time is contained in the parameter data, the dialing operation can be correctly performed so as to produce the dialing tone at a high efficiency. Also, in the previous detection, when a detected reduced number is the reduced number of the typical message phrase which requires the telephone calling telephone number stored in the telephone number memory, the telephone number is read from the telephone number memory based upon this reduced number so as to perform the desired dialing operation. As a consequence, even when no calling telephone number is contained in the message, the correct dialing operation can be performed and the telephone contact to a desired callee can be realized in a higher efficiency.

Basic Idea of Second Paging Receiver

To achieve the above-described first object of the present invention, a basic idea of a second paging receiver will now be described.

In the second paging receiver, a selection is made of the calling telephone number data contained in the received message data, and a dialing tone corresponding to this selected calling telephone number data can be produced.

Circuit Arrangement/Outer View of Second Paging Receiver

A circuit arrangement of the second paging receiver is basically the same as that shown in FIG. 2, and a detailed description thereof will be omitted.

Figure 9:
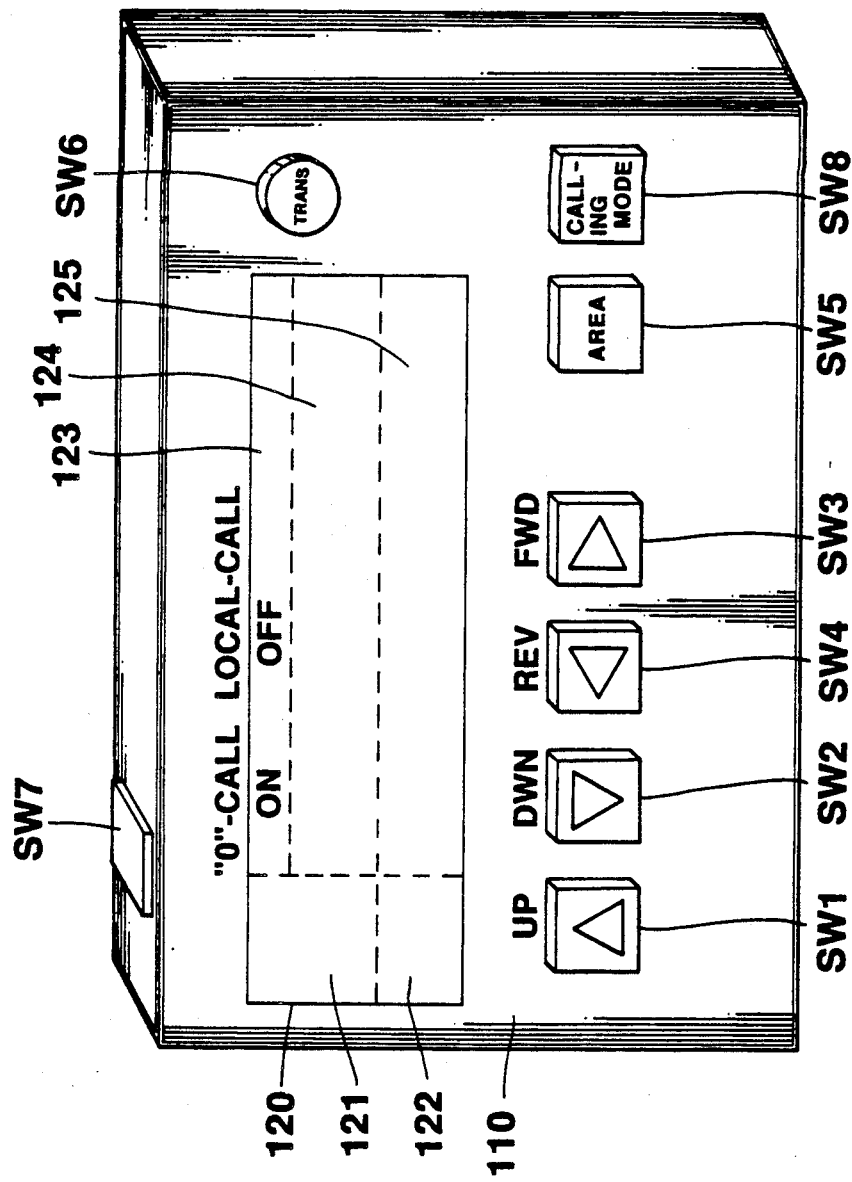
FIG.9 is an outer view of a paging receiver according to a second preferred embodiment of the invention.

An outer view of the second paging receiver is shown in FIG. 9.

In FIG. 9, A display unit 120 is provided in front of the case 110. This display unit 120 is subdivided into two display portion along a vertical line. A front display portion is further subdivided into an upper display section 121 and a lower display section 122. A rear display portion is further subdivided into a upper display section 123, a medium display section 124, and a lower display section 125. The upper display section 121 of the front display portion displays a battery service life, and the like. The lower display section 122 of the front display portion displays a information on calling sort. The upper display section 123 displays a calling mode. When the "0-calling" is set and the "local station calling" is set, "ON" is displayed on this upper display section, wherein "OFF" is displayed thereon when no such a set is effected. The medium display section 124 displays a current time or a reception time. The lower display section 125 displays a received message information. Also, on the case 110, there are provided various keys. That is, an up switch SW1 is provided so as to scroll message data in an upper direction; a down switch SW2 is employed so as to scroll message data in a lower direction; a forward switch SW3 is to move a not displayed character in a left direction when lengthy message information cannot be entirely displayed on the display unit 120. Further, a backward switch SW4 is employed in order to move the displayed characters in a right direction, whereby a front portion of the entire message data is again displayed. An area switch SW5 is provided to be used for selecting a calling telephone number from the message sentences; a transmitting switch SW6 is to produce a dual tone multifrequency signal corresponding to the selected calling telephone number; a reset switch SW7 is to stop a sound and a message display. A final switch, i.e., calling mode switch SW8 is employed so as to set a "0-calling" operation in case of a "0-calling" operation by a dual tone multifrequency telephone receiver, or to set a "local" calling whereby no station number calling is performed while performing a local telephone call. To select above-mentioned an ON/OFF display, after the calling mode switch SW8 is depressed, the up switch SW1 is operated. Further, to select the "0" calling set and "local" calling set under this ON-display condition, after the calling mode switch SW8 is depressed, the forward switch SW3 is manipulated.

Transmission Processing Operation

An overall operation of the second paging receiver equipped with the auto-dialing functin will now be described with reference to a flowchart shown in FIG. 10.

Figure 10:
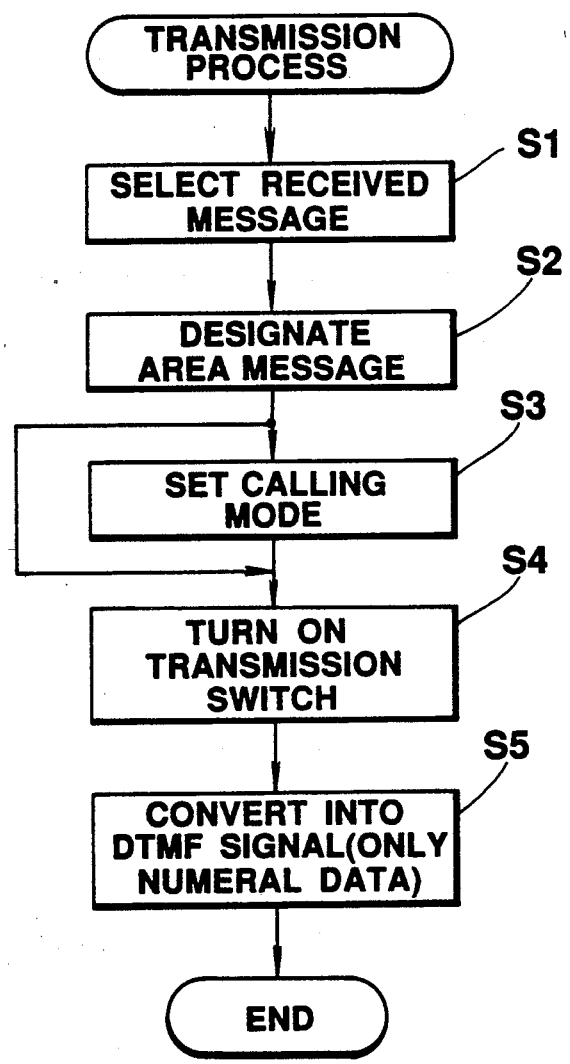
FIG. 10 is a flowchart for explaining a transmission processing operation effected in the second paging receiver shown in FIG. 9.

It should be noted that a plurality of message data have been previously stored into the message memory employed in the second paging receiver, and one piece of these message data is read so as to be displayed on the liquid crystal display unit 120 shown in FIG. 10. When either the up switch SW1 or down switch SW2 is operated, these message data are sequentially read out from the message memory (The message memory 28 in FIG. 2), whereby the received message selection process is performed. Thus, the desirable message data is selectively displayed (step S1).

If the received message data is processed and displayed as, for instance, "(1) 14-00 (2) 03-123-4567", the numeral data after the indication of 03 corresponds to a calling telephone number (i.e., 03-123-4567). In the preferred embodiment, the first indication (1) represents a code instructing a time, whereas the second indication (2) represents a code for indicating a telephone number. In the next step S2, an area designation process for the message data is performed. Then, this calling telephone number "03-123-4567" is selected as follows. That is, when the area switch SW5 is depressed, the first character of the displayed telephone number in the left direction is flickered. While the area switch SW5 is operated, the first character of the above-described message sentence is displayed in an inverted form when the forward switch SW3 is operated one time. Thus, the flicking display portion is moved to the second character along the left direction. Furthermore, when the area switch SW3 is again operated once, the second character of (1) is displayed in the inverted form, and the flicker display portion is moved from the second character to the third character. When the forward switch SW3 is operated 12 time while operating the area switch SW5, the 12th character "(1) 14-00(2)" of the message sentence is displayed in the inverted form. The message data corresponding to the message sentence displayed in the inverted form is masked, and a portion of the message data corresponding to the calling telephone number which is not displayed in the inverted form is selected.

When the received message corresponds to the same content message as the previous example, which contains the typical message phrase code (e.g., "FF01") for instructing "call to the following callee at the following time", the received message data indicates "FF0114D00C03D123D4567", whereas the displayed contents are "call to the following callee at the following time: 14-00 03-123-4567". Also in this case, the message of the step S2 is processed in the area designation process, and the head display portion of the calling telephone number at the flickered portion is equal to "0" by operating the area switch SW5 and forward switch SW3.

Thus, for example, when the calling mode such as the "0-calling and "local" calling operations is set, the calling mode switch SW8, up switch SW1, forward switch SW3 and the like are operated under the condition that the calling telephone number data is selected, as previously described. It is required to produce the dual tone corresponding to the numeral value "0" in front of this calling telephone number when a telephone call is made to a callee defined by this calling telephone number contained in the message information received by the paging receiver according to the second preferred embodiment by way of a push tone telephone receiver, e.g., in case that the telephone call is made from, for instance, a caller in his office to a callee outside his office. However, since there is no zero data in front of the above-described calling telephone number, the up switch SW1 is operated during the calling mode set process as defined in the above-described step S3. As a result, the "ON" is displayed on the upper rear display section 123 of the liquid crystal display unit 120 and then the "0"-calling is set.

Thereafter, when the transmission switch SW6 is operated, the calling telephone number data selected during the area designation process of the message; the data added to the head of this calling telephone number data; or the data produced by deleting the local station calling data from the calling telephone number is selectively output as the DTMF, signal to the speaker (the speaker 25, in FIG. 2) via the DTMF signal generating unit (the unit 23, in FIG. 2). As a result, the dual tone sound is produced from the speaker, which corresponds to the above-described calling telephone number (steps S4 and S5).

In such a specific case that the inverted display portion overlaps the calling telephone number because too many operations of the forward switch SW3 are required during the area designation process of the above-described message, the backward switch SW4 is manipulated so as to release this inverted display portion under the condition that the area switch SW5 is operated. As a result, the masking effect on the message data is also released.

As previously described in detail, in accordance with the second paging receiver, the calling telephone number data is selected from the received message data and thus the dialing tone (dual tone) corresponding to the selected calling telephone number data can be produced.

Also, according to the second paging receiver, a telephone call by a caller can be surely performed to a callee of a calling telephone number even if there is data other than the calling telephone number contained in the received message data.

Basic Idea of Third Paging Receiver

To achieve the above-described third to sixth object of the invention, a basic idea of a third paging receiver will now be summarized.

In an auto-dialing paging receiver according to a third preferred embodiment, there is provided a telephone number memory capable of storing a plurality of telephone numbers for callees or paged persons, and also a dialing number for credit call. In case that either a telephone number contained in a received message, or a telephone number stored the telephone number memory which is designated by a code contained in this received message, the credit call's dialing number which has been stored in the above-described telephone number memory is read out and then combined with the selected telephone number whereby a dialing tone is generated in response to this combination.

With the above-described arrangement of the paging receiver, in case that a telephone call is made by a caller, or pager to the designated telephone number, the dialing number for the credit call which has been previously stored in the memory is automatically read out, and thus the auto-dialing operation can be performed in response to the credit call. As a consequence, even when the caller utilizes a public telephone line, he can communicate with the callee without using a coin into a public telephone receiver.

In accordance with the auto-dialing paging receiver of the third preferred embodiment, a judgement is made whether or not a credit call is acceptable based upon information on calling sorts which is sent from a caller, and such an auto-dialing operation is available for the credit call made by a specific caller.

In this case, the credit call can be performed only when the caller corresponds to a specific person such as an employer, which can thereby prevent an abuse of a credit call.

Circuit Arrangement of the Third Paging Receiver

An outer view of paging receiver acording to a third preferred embodiment is the same as that of the first paging receivers shown in FIG. 1.

Figure 11:
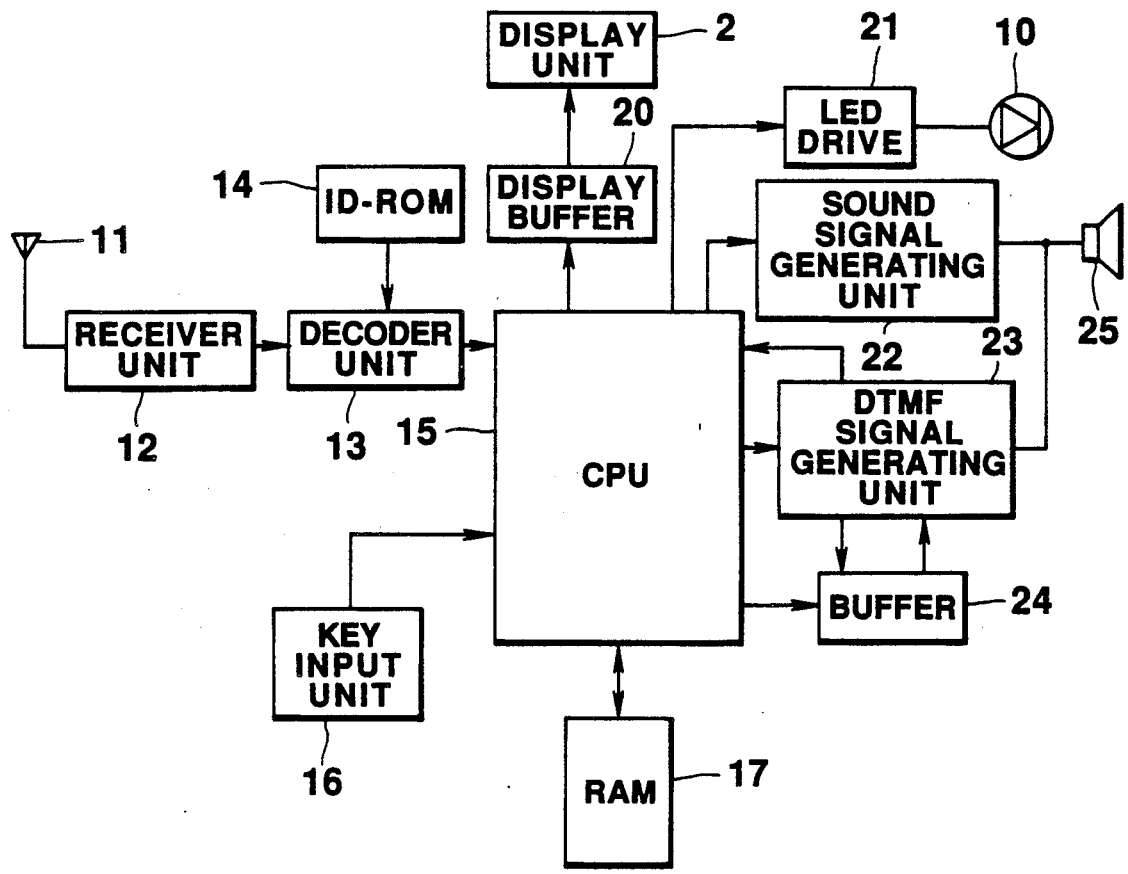
FIG. 11 is a schematic block diagram of a circuit arrangement of a paging receiver according to a third preferred embodiment of the invention.

In FIG. 11, there is shown a circuit arrangement of the third paging receiver. As apparent from this circuit diagram, there is no the typical phase memory 18 and the character generator 19, which are different from the circuit diagram shown in FIG. 2.

Memory Regions of RAM 17

Figure 12:
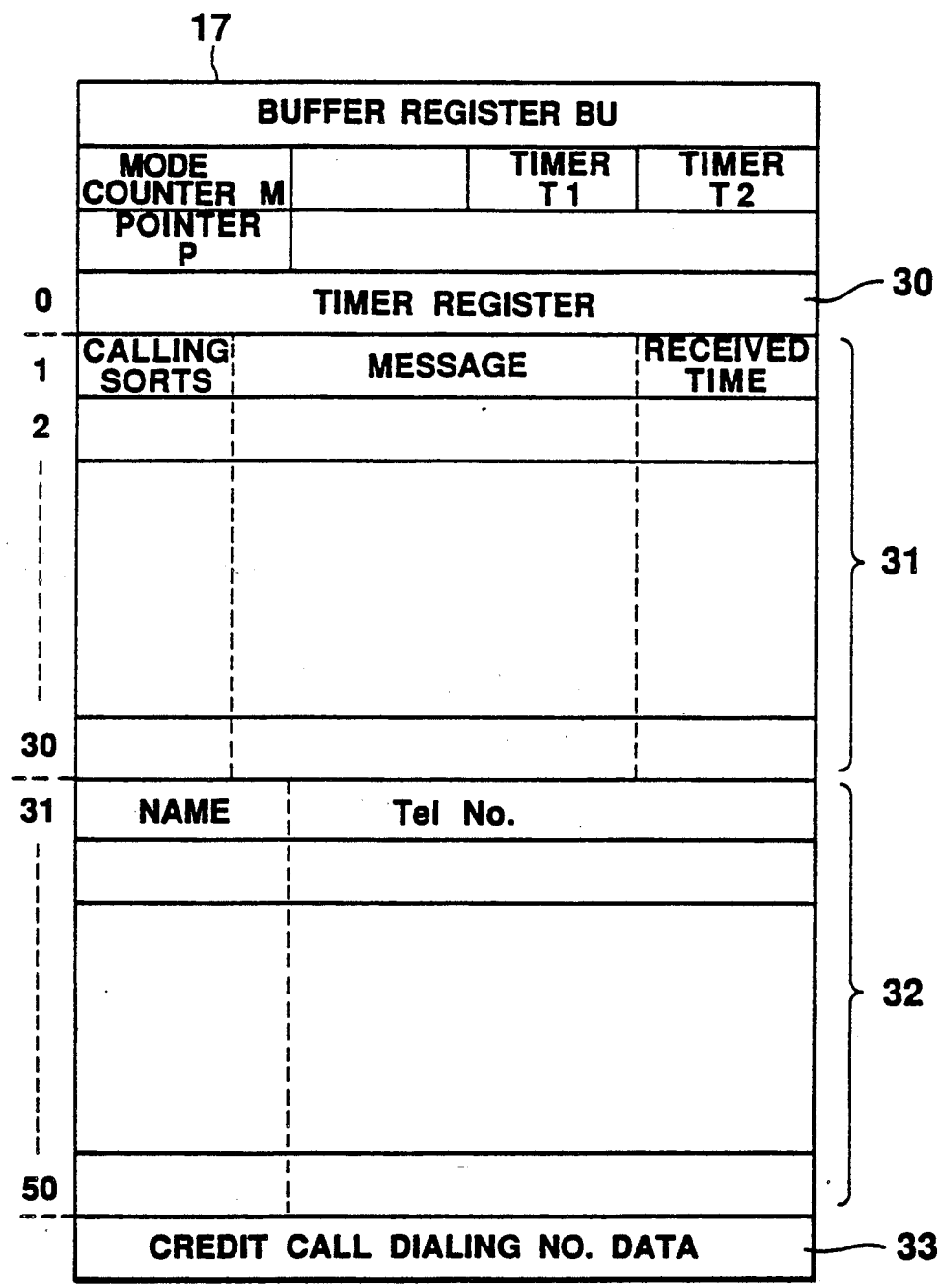
FIG. 12 schematically illustrates memory regions of RAM employed in the third paging receivers shown in FIG. 11.

In FIG. 12, there is a detailed memory regions of RAM 17 employed in the electronic circuit of the third paging receiver shown in FIG. 11.

Although a major memory region of RAM 17 employed in the third paging receiver is almost the same as that of the first paging receiver as shown in FIG. 4, the following memory regions are different.

That is, as represented in FIG. 12, a credit call memory 33 for storing the additional dialing number for credit call "P". A credit call dialing number is written into the credit call memory unit 33, in which a stop code for stopping a generation of a dialing tone for a predetermined time period due to a second dialing tone, has been inserted. This credit call dialing number may be previously written for the sake of confidence by a person, e.g., an employer who lends a paging receiver to an employee. After the write mode is designated by the mode key 6, for instance, the address of the credit call memory unit 33 is designated by utilizing the pass word. Thereafter the writing operation of the credit call dialing number can be performed by the numeral key 4.

Overall Operation of Third Paging Receiver

Figure 13:
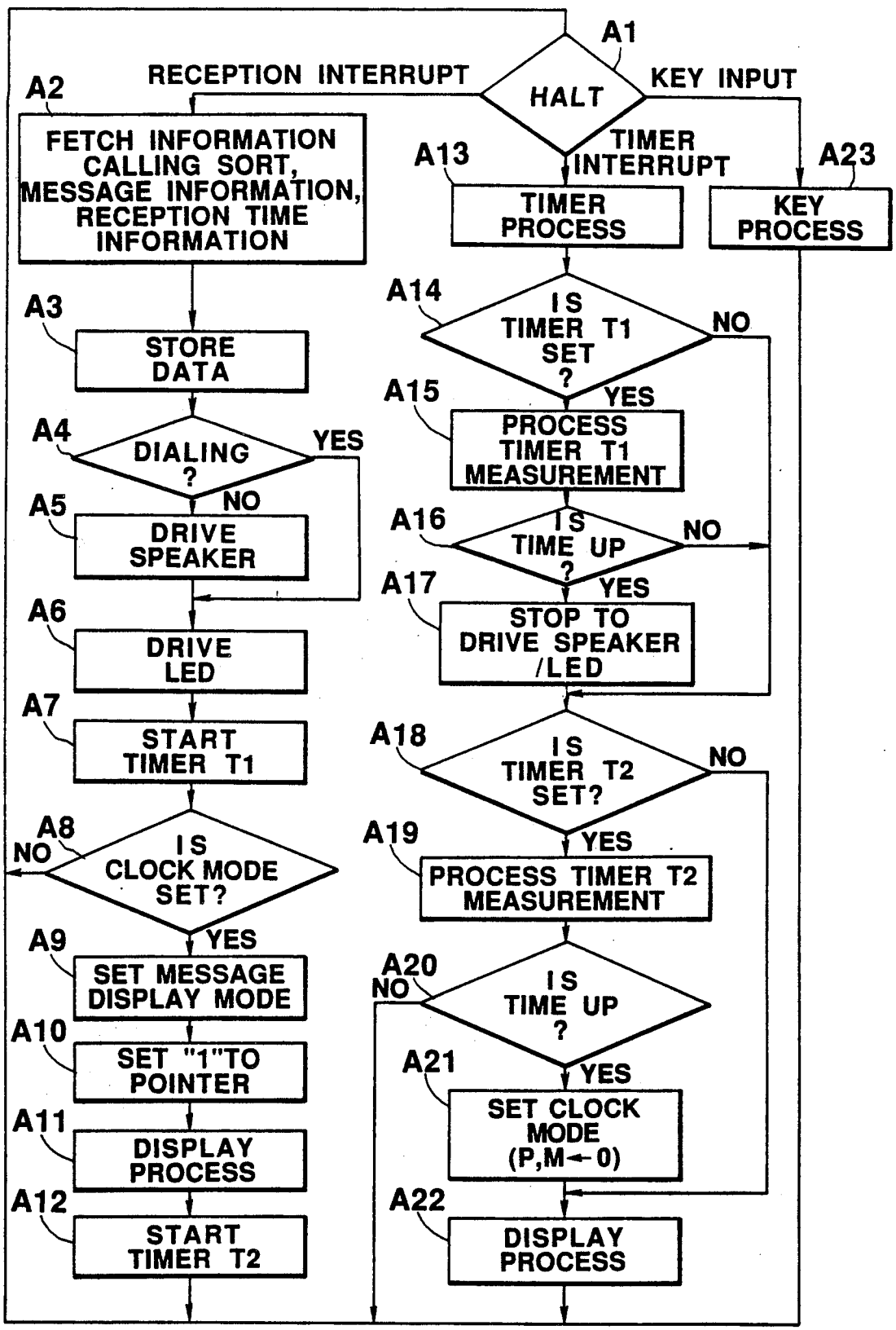
FIG. 13 is a flowchart for explaining an overall operation of the third paging receiver shown in FIG.11.

An overall operation of the paging receiver according to the third preferred embodiment of the invention will now be described with reference to the circuit diagram of FIG. 11 and also a flowchart of FIG. 13.

CPU 15 performs the following three process operations:

1) when a call is made by a caller; 2) when a timer operation is executed; and 3) when a key operation is carried out. Assuming that a telephone call made by a caller is received by the receiver unit 12, and this telephone call corresponds to a telephone number for calling this paging receiver itself, the reception fetch instruction is sent from the decoder unit 13 to CPU 15. Then, a reception interruption is produced. CPU 15 advances the processing operation from a HALT condition defined at a step A1 to a next step A2, as represented in FIG. 13. At this step A2, the information on calling sort (as previously described, function bit information), and meseage information which are attached to the calling telephone number are fetched and the reception time information (i.e., the contents of the timer register 30) is fetched to be temporarily stored into the buffer register "BU" in RAM 17. After the informatin have been fetched into the buffer register "BU", these information are transferred to the message register unit 31 to be stored in the address of 1 (step A3). In this case, if other information have been held at the respective addresses of the message register unit 31, these information are sequentially shifted to the subsequent address prior to the new data fetch. That is to say, the latest received information is always written and held at the address of "1" of the message register unit 31. Thereafter, a judgement is made whether or not a dialing operation is performed at a step A4. In other words, a check is made whether or not a dialing operation effected by the DTMF signal generting unit 23 is performed (step A4). If no dialing operation is carried out, an operation instruction is sent from CPU 15 to the sound signal generating unit 22 and thus the speaker 25 is driven at a predetermined frequency, whereby a sound announcement of calling reception is accomplished (step A5). Furthermore, another drive instruction is sent from CPU 15 to the LED drive unit 21 so as to turn ON LED 10, whereby a lighting announcement of calling reception is accomplished (step A6). In this case, to the contrary, if a dialing operation is executed, no speaker 25 is driven, but only LED 10 is driven for the lighting announcement of calling reception. At this time, the timer "T1" is set which is provided within RAM 17 so as to control the announcing time (step A7).

Thereafter, a check is made whether or not the set mode made at this time corresponds to the clock mode. In other words, a judgement is effected whether or not the count value of the mode counter "M" in RAM 17 is equal to "0 (zero)" (step A8). If the clock mode is not set, then the process is returned directly to the precious step A1 of "HALT" condition.

When the clock mode is designated, the count value of the mode counter M is incremented by 1, so that the message display mode is set (step A9) and also "1" is set to the pointer "P" (step A10). Under this condition, CPU 15 reads the content of the address "1" in the message register unit 31 designated by the pointer "P", and then outputs the read content to the display buffer 20 for displaying the content at the display unit 2 (step A11). In this case, the message received time is displayed at the upper display area 2a of the display unit 2, and both the information on calling sort and message are displayed on the lower display area 2b thereof. At this time, the second timer T2 for controlling the message display time is set (step A12), and thereafter the process is returned to the "HALT" condition of the step A1.

Under this condition, when a timer interrupt is produced, the process advances to a step A13 where the timer process is performed. This timer interrupt is produced for, e.g., 1 second interval. As a result, the timer information within the timer register 30 is incremented by 1. Then, a judgement is made whether or not the first timer T1 has been set (step A14). When the first timer T1 is set, the count value of this timer T1 is incremented by 1 (step A15), and thereafter a further judgement is made whether or not the time measuring value of this timer T1 reaches a preset value, e.g., 8 seconds in the preferred embodiment (step A16). If the measuring value does not yet reach 8 seconds, another judgement is made whether or not the second timer T2 has been set (step A18). To the contrary, when the measuring value reached 8 seconds, the sound announcement and the lighting announcement an stopped (step A17), and thereafter the process is advanced to the previous step A18. When a judgement is made that the timer T1 is not set in the step A14, no time measurement by the timer T1 is carried out and the process is advanced to the previous step A18 where another judgement is performed whether or not the second timer T2 is brought into the set condition. When the second timer T2 is set, the count value of this timer T2 is incremented by 1 (step A19), and thereafter a further judgement is made whether or not this count value reaches another preset value, e.g., 30 seconds in the preferred embodiment (step A20). If not yet reach 30 seconds, the process is returned to the "HALT" condition of the step A1.

The above-described timer interrupt process is repeatedly executed every a predetermined time period. As a result of such timer interrupt process, when the first timer T1 is brought into the time-up condition, namely 8 seconds have elapsed, then the drive stop instruction is sent from CPU 15 to the LED drive unit 21 and sound signal generating unit 22, whereby both the lighting and sound announcements by the LED 10 and speaker 25 are interrupted. Furthermore, when the second timer T2 is brought into the timer-up condition, namely 30 seconds have passed, "0" is set from CPU 25 to the mode counter M so that the clock mode is designed and also "0" is set to the pointer "P". When "0" is set to this pointer "P", the present time information stored at the address of "0" is read out from the timer register 30 via CPU 15 to the display buffer 20. As a result, this present time information is displayed on the upper display area 2a of the display unit 2 (step A22) as represented in FIG. 1. To the contrary, when the second timer T2 is not yet set, the process is directly advanced from the step A18 to the step A22, whereby the above-explained present time information is displayed.

As previously described, in the auto-dialing paging receiver according to third preferred embodiment, when a telephone call made by a caller is received, the announcements by LED 10 and speaker 25 for reporting a receipt of the telephone call are performed for 8 seconds, and the received message is displayed on the display unit 2 for 30 seconds. Thereafter, the process is returned to the normal clock mode and the present time is displayed.

Credit Code Processing Operation

When a key operation signal derived from the key input unit 16 shown in FIG. 11 is input into CPU 15, the process advances from the "HALT" condition of the step A1 to a further step A23, whereby a key process is executed.

Figure 14A:
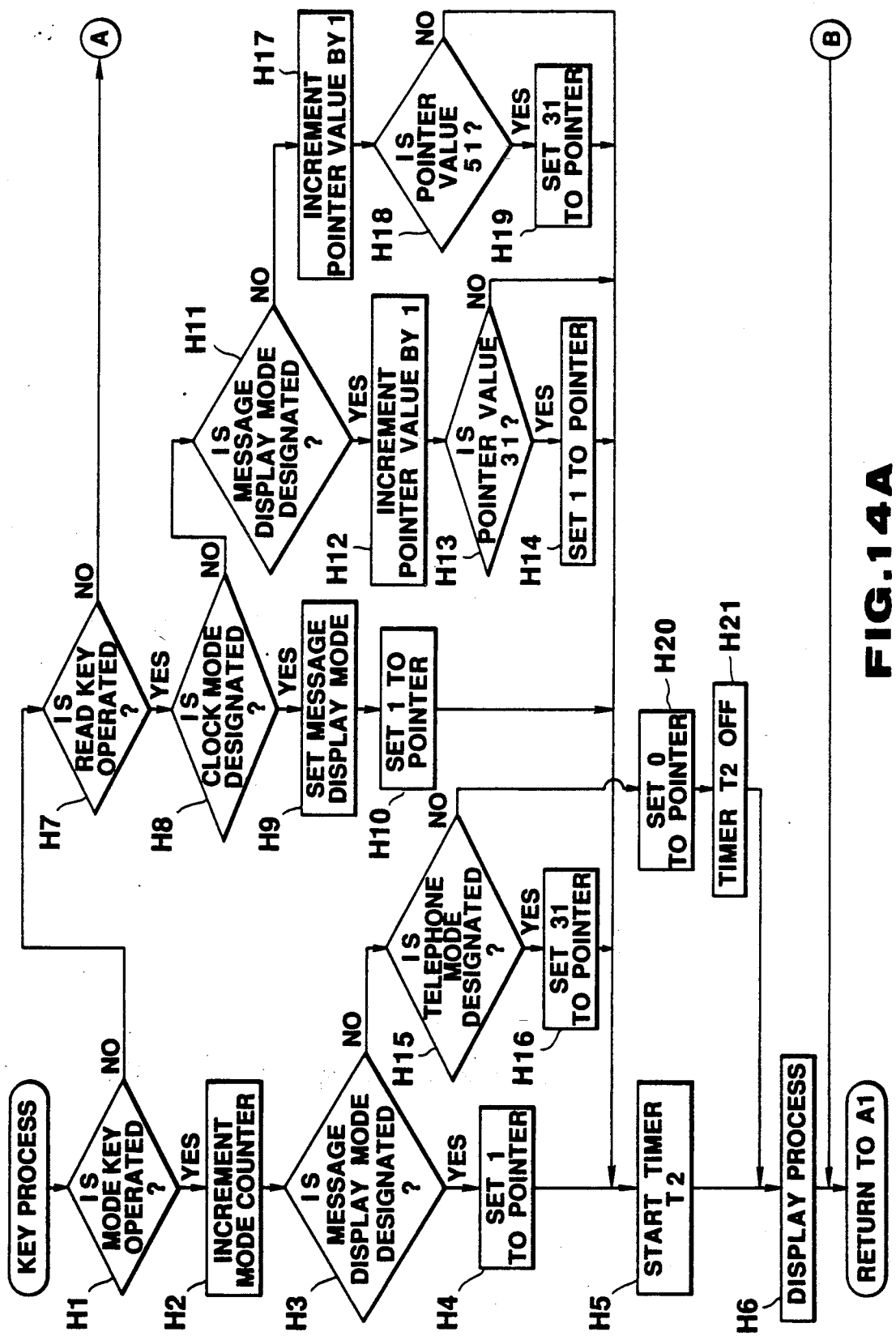
FIGS. 14A and 14B are flowcharts for explaining a credit code processing operation effected by the third paging receiver.
Figure 14B:
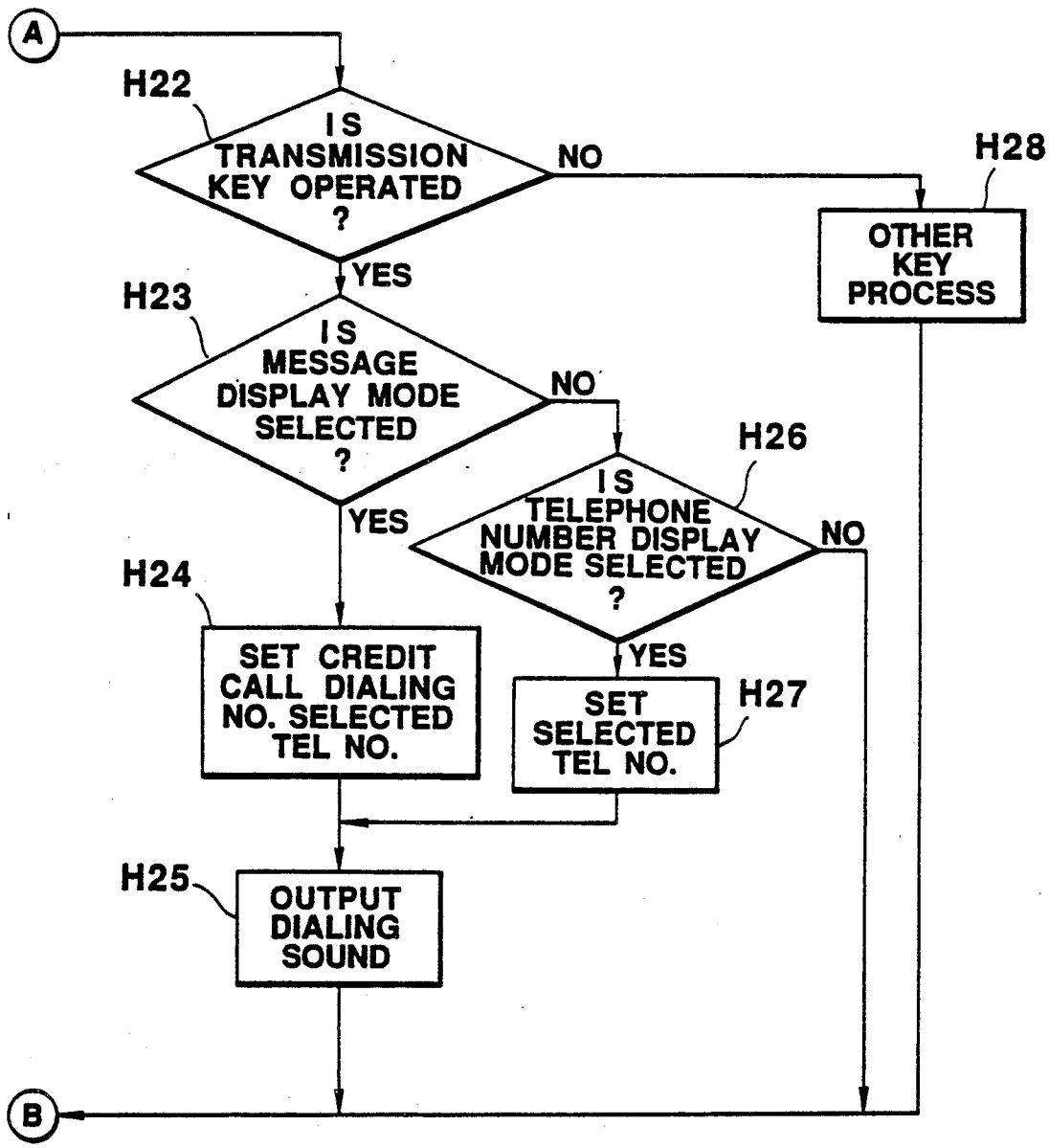

Referring now to a flowchart shown in FIGS. 14A and 14B, this key process will be described in detail. To display on the display unit 2 the message information stored in the message register unit 31 within RAM 17, the message display mode is designated by the mode key 6, or the read key 7 is operated in the clock mode.

When the key operation is performed under this condition, a judgement is made whether or not the operated key corresponds to the mode key 6 at a step H1. If the mode key 6 is operated, after the count value of the mode counter M is incremented by 1 (step H2), another check is made whether or not the message display mode (mode counter M=1) is selected (step H3). If the message display mode is selected, then "1" is set to the pointer "P" (step H4) and simultaneously the time measuring operation by the second timer T2 is commenced (step H5). Then, the information stored at the address which has been designated by the pointer "P", namely the memory information at the address "1" in this case, i.e., the information on calling sort, message, and received time are read out displayed on the display unit 2 (step H6). In other words, when the message display mode is designated by the mode key 6, the newest message information which has been finally stored at the address of 1 in the message register unit 31 is displayed on the display unit 2.

When the read key 7 is operated in the clock mode, the process is advanced from the step H1 to a step H7, and a judgement is made whether or not the operated key corresponds to the read key 7. In this case, since the read key 7 operated, another judgement is performed whether or not the clock mode (M=0) is selected in a further step H8. Since at this time, the clock mode has been designated, the content of the mode counter "M" is incremented by 1, the message display mode is designated (step H9) and also "1" is set to the pointer "P" (step H10). Thereafter, the process advances via the above-described step H5 (i.e., to start the timer T2) to the step H6, and as previously described, the message information which has been stored at the address of 1 in the message register unit 31 is displayed on the display unit 2.

When the subsequent message is displayed under such a condition that the above-described message information is being displayed, then the read key 7 is operated. When this read key 7 is operated, the process advances to a step H11 via the steps H1, H7 and H8, in which a judgement is made whether or not the message display mode is designated. In this case, as previously explained, since the message display mode has been designated, the pointer "P" is incremented by 1 (step H12) and thereafter, whether the incremented value thereof reaches 31 is checked (step H13). If the value of the pointer "P" does not yet reach 31, the process advances via the step H5 to the step H6 in which the above-described message is processed. In other words, the information stored in the message register unit 31 which is designated by the value of the pointer "P" is read out and then displayed on the display unit 2. Similarly, every time the read key 7 is operated, the value of the pointer "P" is incremented by 1, the designated address for the message register unit 31 is updated, the message information stored in the message register unit 31 is successively read to be displayed on the display unit 2. When the value of the pointer "P" by operating the read key 7 exceeds over the final address (i.e., address of 30) of the message register unit 31, this condition is detected at a step H13. Then, "1" is set to the pointer "P" in the subsequent step H14. As a result, the designated address of the message register unit 31 is returned to the first address of "1" and the information stored at this address is displayed on the display unit 2. As previously described, the various information stored in the message register unit 31 is sequentially displayed on the display unit 2 by operating the read key 7. In such a specific case that no key is operated under this message display condition, when the time measurement by the second timer T2 is performed for 30 seconds, the process is returned to the clock mode.

When the telephone number stored in the telephone number memory 32 of RAM 17 is displayed on the display unit 2, the telephone number display mode is designated by the mode key 6. When the mode key 6 is operated to designate the telephone number display mode, the process advances via the steps H1, and H2 to the step H3, in which a judgement is made whether or not the message display mode is designated. In this case, since the telephone number display mode has been designated, the judgement result of the step H3 is "NO". Then, the process is advanced to a step H15, in which a judgement is made whether or not the telephone number display mode or telephone number write mode is designated. When the telephone number display mode, or telephone number write mode is designated, "31" is set to the pointer "P" in the subsequent step H16. Thereafter, the process advances from the step H5 to the step H6 so that the display process is performed. In other words, when the address of "31" of the telephone number memory unit 32 is designated by the pointer "P", the name and telephone number which have been stored at this address of 31 are read out via CPU 15 to the read buffer 20, so that the name is displayed on the upper display area 2a on the display unit 2, whereas the telephone number is displayed on the lower display area 2b thereof.

Then, when other telephone number which has been stored in the telephone number memory unit 32 is read out so as to be displayed on the display unit 2, the read key 7 is operated under this condition. When this read key 7 is operated, the process advances via the steps H1, H7, and H8 to the step H11, in which a judgement is made whether or not the message display mode is designated. In this case, since the message display mode is not designated, a judgement result becomes "NO" and then the process advances to a step H17. Then, the value of the pointer "P" is incremented by 1. Thereafter, a check is made whether or not the incremented value of the pointer "P" reaches "51", namely whether or not the value of the pointer "P", exceeds over the last address of the telephone number memory 32. If not exceeds over the last address, the process advances via the step H5 to the step H6. In this step H6, the information stored in the telephone number memory unit 32 which is designated by the value of the pointer "P", is read and displayed on the display unit 2. As previously described, in this telephone number display mode, the value of the pointer is incremented by 1 every time the read key 7 is operated, and both the name and telephone number which have been stored in the telephone number memory unit 32 are sequentially read so as to be displayed on the display unit 2. If the value of the pointer "P" exceeds over the last address (i.e., address of 50) of the telephone number memory unit 32 and reaches the address of 51 while operating the read key 7, this condition is detected in a step H18. Then, "31" is set to the value of the pointer "P" in the next step H19. As a result, the address designation of the telephone number memory unit 32 is returned to the first address, is read to be displayed on the display unit 2.

Also in the telephone number write mode, the information stored in the telephone number memory unit 32 is displayed on the display unit 2, which is similar to the telephone number display mode. In accordance with this telephone number write mode, after the displayed content is corrected or rewritten by operating the numeral key 4, the resultant content may be written into the corresponding address of the telephone number memory unit 32. A key process for setting this telephone number is carried out at a step H28 (will be discussed later).

When the mode key 6 is operated to change either the message display mode or telephone number display mode into the clock mode, the judgement results in the steps H3 and H15 become "NO", and the process advances to a step H20 in which "0" is set to the value of the pointer "P". Thereafter the second timer T2 is turned off (step H21), and the process is returned to the display process defined by the previous step H6. As a result, the address of "0" of the timer register 30 is designated by the pointer "P", and the timer information stored at the address of "0" is read out to the display buffer 20 and then displayed on the display unit 2.

Auto-Dialing Operation of Third Paging Receiver

In case of the auto-dialing operation, either the message display mode or telephone display mode is designated and the transmission key 8 is operated under the condition that a telephone number to be called is displayed on the display unit 2. When this transmission key 8 is manipulated, the judgement result of the steps H1 and H7 in the flowchart shown in FIG. 14A are both "NO", and then the process advances to a step H22, in which a judgement is made whether or not the transmission key 8 is operated. If the transmission key 8 is operated, another judgement is made whether or not the message display mode is designated in the step H23. When the message display mode is designated, the credit call dialing number which has been stored in the credit call memory 33 is read from RAM 17 by CPU 15, and the read credit call dialing number is combined with the telephone number portion of the received message data displayed on the display unit 2 so as to be set into the buffer 24 (step H24). Thereafter, an operation instruction is sent from CPU 15 to the DTMF signal generating unit 23. As a result, the DTMF signal generating unit 23 is activated to produce the DTMF signal in accordance with the telephone number which has set in the buffer 24, so that the speaker is driven (step H25). When the dialing operation is accomplished, the DTMF signal generating unit 23 outputs an end signal to CPU 15. In case that the transmission key 8 is operated in the above-described message display mode, the dialing operation is perfomred in accordance with the credit call.

If a judgement is made in the previous step H23 that no message display mode is designated, another judgement is made whether or not the telephone number display mode is designated (step H26). If the telephone number display mode is designated, the telephone number which has been read from the telephone number memory unit 32 and is being displayed on the display unit 2 in this case, is set into the buffer 24 (step H27). Thereafter, an operation instruction is transferred from CPU 15 to the DTMF signal generating unit 23. As a result, the DTMF signal generating unit 23 is operated and thus, the DTMF signal is generated based upon the telephone number which has been set in the buffer 24, so as to drive the speaker 25 (step H25). As previously described, when the transmission key 8 is operated in the telephone number display mode, the normal dialing operation is executed, not the credit calling operation. If another judgement is made in the previous step H26 that the telephone number display mode is not designated, no dialing operation is carried out but the process advances to the step A1 shown in the flowchart of FIG. 13.

When the numeral keys 4, shift key 5 and the like are operated so as to set the telephone number, judgement results in the steps H1, H7 and H22 become "NO" and the process advances to a step H28 in which a predetermined key process is performed.

Modifications of Third Paging Receiver

In accordance with the preferred embodiment, the calling information received as the message data may contain not only the telephone number, but also other information for designating the address of the telephone number memory unit 32. As a result, in the latter case, the telephone number is read out by designating the address of the telephone number memory 32 in response to the code contained in the message, and then the dialing operation is performed in combination with the credit call dialing number.

In case that the above-described credit call is utilized, the information on calling sort may be added thereto as its condition. In this case, in the display process step H6 in the key process flow as represented in FIG. 14A, the information on a fact that the credit call is acceptable or not based upon the information on calling sorts is transferred together with the memory information to CPU 15. Then, such a fact that the credit call is acceptable or not is represented by, for instance, a marker flushing or marking display. Also in the process on the operation of the transmission key 8, after a judgement is made that the message display mode is designated in step H23 in FIG. 14B, a judgement is made whether or not the credit call is acceptable. If NO, then only the telephone number which has been selected to the buffer 24 for the auto-dialing operation is set so as to perform the dialing operation. With such an arrangement, the credit call can be utilized only for the message made by a specific caller.

As the information on calling sorts, not only the above-described function information, but also a plurality of calling telephone numbers may be previously stored in ID-ROM. Then, the calling number may contain the identification information for identifying which number has been called by the calling number, or a combination of the calling number with this identification information.

While having been described above, in accordance with the auto-dialing type paging receiver according to the third preferred embodiment, when a selection is made as a dialing telephone number in a telephone number which has been stored in the telephone number memory designated by the code contained in the received message, or the telephone number contained in the received message, the credit call dialing number stored in the telephone number memory is read and combined with the above-described selected telephone number, whereby the dialing operation is automatically performed based on the resultant telephone number. As a result, the auto-dialing operation is performed based upon the credit call, which is very convenient, as compared with a use of the public telephone calling.

Since the credit call can be utilized only when only a right caller is identified, the abuse of the credit call can be surely prevented according to the preferred embodiment.

Basic Idea of Fourth Paging Receiver

To achieve the above-described third to sixth object of the invention, a basic idea of a fourth paging receiver will now be summarized.

That is, in accordance with the paging receiver including an auto-dialing function of the fourth preferred embodiment, both calling information sent from a caller as message information is read out so as to be displayed, a clear representation is made whether or not the telephone number displayed on the display unit can be used as the credit call. Also, while the dialing tone with respect to the displayed telephone number is produced, the credit call dialing number is read from the memory when the credit call is allowed based upon the control information, and then the read telephone number is combined with the calling telephone number whereby the dialing sound is output. Otherwise, when the credit call is not permitted, the dialing sound based upon only the calling telephone number is output.

With the above-described arrangement, when a telephone call is made to a predetermined callee designated by a caller, the credit call telephone number which has been previously stored in the memory only if the credit call is permitted is read out, whereby the auto-dialing operation is carried out based upon the cedit call telephone number. As a result, even if a public telephone line is utilized, a telephone call can be effected without putting a coin into the public telephone receiver. Since the permission based upon the control information which is sent as the message information from the caller, the unauthorized use of this credit call can be prevented.

Fourth Paging Receiver

It should be noted that since an outer view of a fourth paging receiver, an electronic circuit employed therein, data formats utilized therein, and also memory regions of RAM in this electronic circuit thereof are the same as those of the third paging receiver, no detailed explanation thereto will be made in the following descriptions.

Overall Operation of Fourth Paging Receiver

An overall operation of the above-described fourth paging receiver will now be described as follows. Since the major operation of the fourth paging receiver is very similar to that of the third paging receiver (see FIG. 13), no further explanation thereof is made in the following descriptions.

It should be noted that only different operations will be explained. That is, the message information sent from the above-described caller contains both the calling telephone number and the control information for indicating whether or not the credit call is available. As this control information, two pieces of "F" codes consisting of hexadecimal numeral are used for indicating, for example, a left brace, "CC". In other words, the double parentheses is used as the permission code or the credit call. Thus, the credit call is allowed only if this permission code is contained in the received message.

Permission Code Processing Operation

When a key operation signal derived from the key input unit 16 shown in FIG. 11 is input into CPU 15, the process advances from the "HALT" condition of the step A1 to the step A23 in which a key process for the permission code is performed. This permission code key process will now be described in detail with reference to a flowchart shown in FIGS. 15A and 15B. To display on the dispaly unit 2 the message information stored in the message register unit 31 within RAM 17, the message display mode is designated by the mode key 6, or the read key 7 is operated in the clock mode.

When the key operation is performed under this condition, a judgement is made whether or not the operated key corresponds to the mode key 6 at a step H1. If the mode key 6 is operated, after the count value of the mode counter M is incremented by 1 (step H2), another check is made whether or not the message display mode (mode counter M−1) is selected (step H3). If the message display mode is selected, then "1" is set to the poiner "P" (step H4) and simultaneously the time measuring operation by the second timer T2 is commenced (step H5). Then, the information stored at the address which has been designated by the pointer "P", namely the memory information at the address "1" in this case, i.e., the information on calling sort, message, and received time are read out and displayed on the display unit 2 (step H6). In other words, when the message display mode is designated by the mode key 6, the newest message information which has been finally stored at the address of 1 in the message register unit 31 is displayed on the display unit 2.

When the read key 7 is operated in the clock mode, the process is advanced from the step H1 to a step H7, and a judgement is made whether or not the operated key corresponds to the read key 7. In this case, since the read key 7 is operated, another judgement is performed whether or not the clock mode (M=0) is selected in a further step M8. Since at this time, the clock mode has been designated, the content of the mode counter "M" is incremented by 1, the message display mode is designated (step H9) and also "1" is set to the pointer "P" (step H10). Thereafter, the process advances via the above-described step B5 (i.e., to start the timer T2) to the step H6, and as previously described, the message information which has been stored at the address of 1 in the message register unit 31 is displayed on the display unit 2.

When the subsequent message is displayed under such a condition that the above-described message information is being dispalyed, then the read key 7 is operated. When this read key 7 is operated, the process advances to a step H11 via the steps H1, H7 and H8, in which a judgement is made whether or not the message display mode is designated. In this case, as previously explained, since the message display mode has been designated, the pointer "P" is incremented by 1 (step H12) and thereafter, whether the incremented value thereof reaches 31 is checked (step H13). If the value of the pointer "P" does not yet reach 31, the process advanced via the step H5 to the step H6 in which the above-described message is processed. In other words, the information stored in the message register unit 31 which is designated by the value of the pointer "P" is read out and then displayed on the display unit 2. Similarly, every time the read key 7 is operated, the value of the pointer "P" is incremented by 1, the designated address for the message register unit 31 is updated, the message information stored in the message register unit 31 is successively read to be displayed on the display unit 2. When the value of the pointer "P" by operating the read key 7 exceed over the final address (i.e., address of 30) of the message register unit 31, this condition is detected at a step H13. Then, "1" is set to the pointer "P" in the subsequent step H14. As a result, the designated address of the message register unit 31 is returned to the first address of "1" and the information stored at this address is displayed on the display unit 2. As previously described, the various information stored in the message register unit 31 is sequentially displayed on the display unit 2 by operating the read key 7. In such a specific case that no key is operated under this message display condition, when the time measurement by the second timer T2 is performed for 30 seconds, the process is returned to the clock mode.

When the telephone number stored in the telephone number memory 32 of RAM 17 is displayed on the display unit 2, the telephone number display mode is designated by the mode key 6. When the mode key 6 is operated to designate the telephone number display mode, the process advances via the step H1, and H2 to the step H3, in which a judgement is made whether or not the message display mode is designated. In this case, since the telephone number display mode has been designated, the judgement result of the step H3 is "NO".

Then, the process is advanced to a step H15, in which a judgement is made whether or not the telephone number display mode or telephone number write mode is designated. When the telephone number display mode, or telephone number write mode is designated, "31" is set to the pointer "P" in the subsequent step H16. Thereafter, the process advances from the step H5 to the step H6 so that the display process is performed. In other words, when the address of "31" of the telephone number memory unit 32 is designated by the pointer "P", the name telephone number and identification flag which have been stored at this address of 31 are read out via CPU 15 to the display buffer 20, so that the name is displayed on the upper display area 2a on the display unit 2, whereas the telephone number is displayed on the lower display area 2b thereof.

Then, when other telephone number which has been stored in the telephone number memory unit 32 is read out so as to be displayed on the display unit 2, the read key 7 is operated under this condition. When this read key 7 is operated, the process advances via the steps H1, H7 and H8 to the step H11, in which a judgement is made whether or not the message display mode is designated. In this case, since the message display mode is not designated, a judgement result becomes "NO" and then the process advances to a step H17. Then, the value of the pointer "P" is incremented by 1. Thereafter, a check is made whether or not the incremented value of the pointer "P" reaches "51", namely whether or not the value of the pointer "P" exceeds over the last address of the telephone number memory 32. If not exceeds over the last address, the process advances via the step H5 to the step H6. In this step H6, the information stored in the telephone number memory unit 32 which is designated by the value of the pointer "P", is read and displayed on the display unit 2. As previously described, in this telephone number display mode, the value of the pointer is incremented by 1 every time the read key 7 is operated, and both the name and telephone number which have been stored in the telephone number memory unit 32 are sequentially read so as to be displayed on the display unit 2. If the value of the pointer "P" exceeds over the last address (i.e., address of 50) of the telephone number memory unit 32 and reaches the address of 51 while operating the read key 7, this condition is detected in a step H18. Then, "31" is set to the value of the pointer "P" in the next step H19. As a result, the address designation of the telephone number memory unit 32 is returned to the first address, and thus the information stored at this address is read to be displayed on the display unit 2.

Also in the telephone number write mode, the information stored in the telephone number memory unit 32 is displayed on the display unit 2, which is similar to the telephone number display mode. In accordance with this telephone number write mode, after the displayed content is corrected or rewritten by operating the numeral key 4, resultant content may be written into the corresponding address of the telephone number memory unit 32.

When the mode key 6 is operated to change either the message display mode or telephone number display mode into the clock mode, the judgement results in the steps H3 and H15 become "NO", and the process advances to a step B20 in which "0" is set to the value of the pointer "P". Thereafter the second timer T2 is turned off (steo H21), and the process is returned to the display process defined by the previous step H6. As a result, the address of "0" of the timer register 30 is designated by the pointer "P", and the timer information stored at the address of "0" is read out to the display buffer 20 and then displayed on the display unit 2.

Auto-Dialing Operation of Fourth Paging Reciever

In case of the auto-dialing operation, either the message display mode or telephone display mode is designated and the transmission key 8 is operated under the condition that a telephone number to be called is displayed on the display unit 2.

Figure 15A:
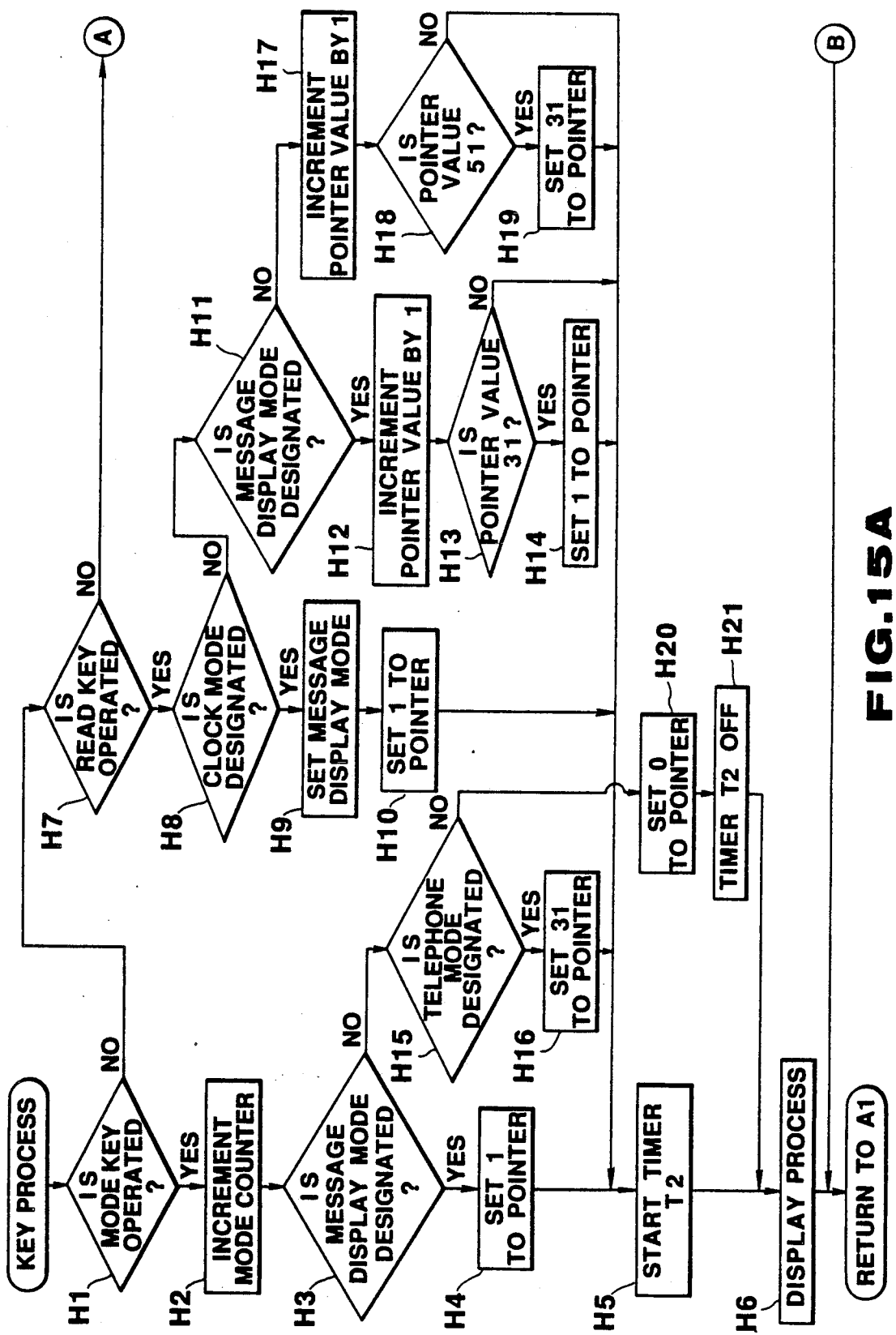
FIGS. 15A and 15B are flowcharts for explaining a permission code processing operation performed in a paging receiver according to a fourth preferred embodiment of the invention.
Figure 15B:
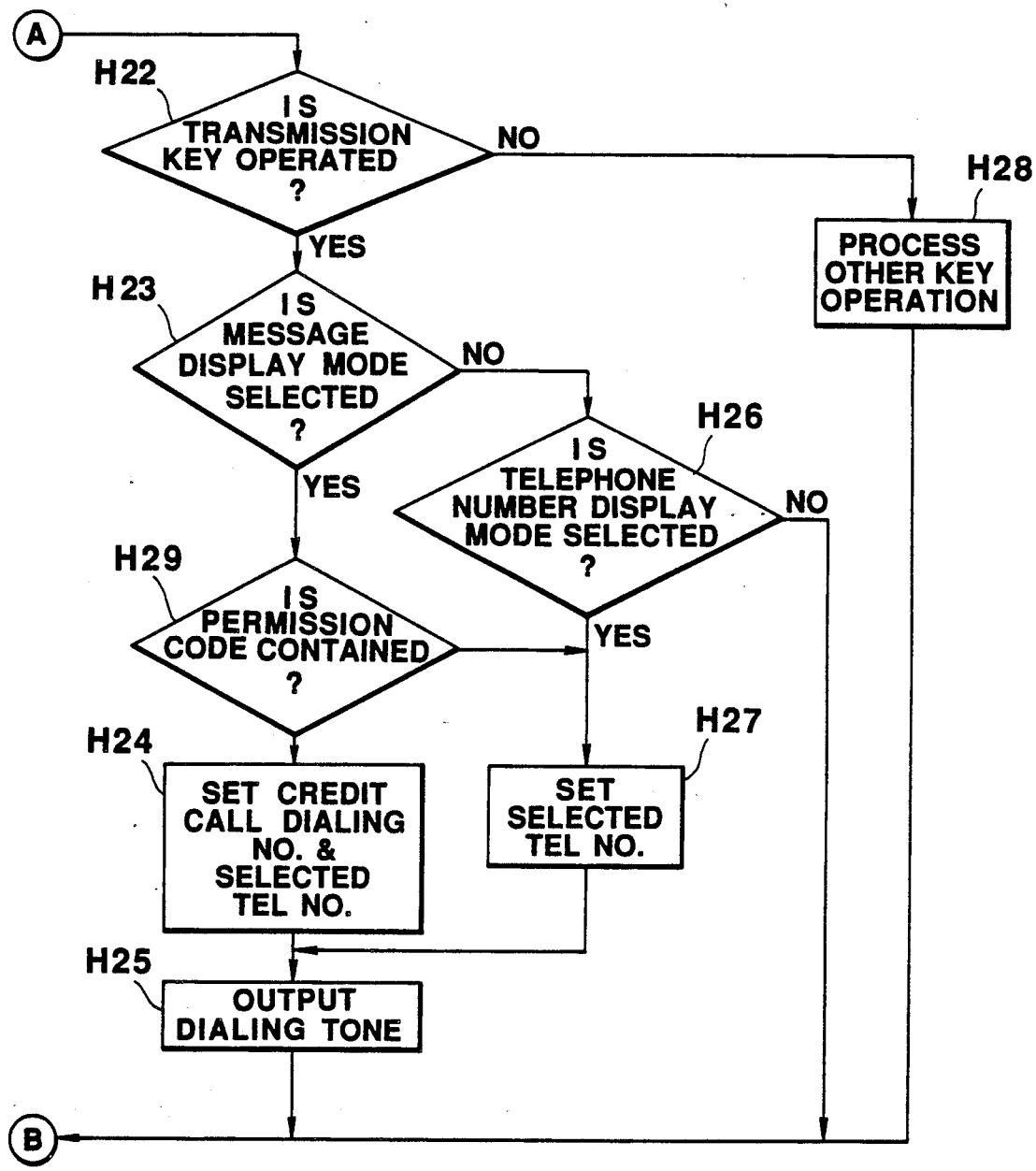

When this transmission key 8 is manipulated, the judgement results of the steps H1 and H7 in the flowchart shown in FIG. 15A are both "NO", and then the process advances to a step H22, in which a judgement is made whether or not the transmission key 8 is operated. If the transmission key 8 is operated, another judgement is made whether or not the message display mode is designated in a step H23. In case that the message display mode is designated, a judgement is made whether or not a permission code is contained in the message (step H29). When the permission code is contained, the credit call dialing number which has been stored in the credit call memory 33 is read from RAM 17 by CPU 15, and the read credit call dialing number is combined with the telephone number portion of the received message data displayed on the dispaly unit 2 so as to be set into the buffer 24 (step H4). Thereafter, an operation instruction is sent from CPU 15 to the DTMF signal generating unit 23. As a result, the DTMF signal generating unit 23 is activated to produce the DTMF signal in accordance with the telephone number which has set in the buffer 24, so that the speaker 25 is driven (step H25). In the above step H29, if the permission code is not contained in the received message, the process advances to this step H27, the telephone number portion of the received message data displayed on the display unit 2 is transferred to the buffer 24. When the dialing operation is accomplished, the DTMF signal generating unit 23 outputs as end signal to CPU 15. In case that the transmission key 8 is operated in the above-described message display mode, the dialing operation is performed in accordance with the credit call.

If a judgement is made in the previous step H23 that no message display mode is designated, another judgement is made whether or not the telephone number display mode is designated in the step H26. If the telephone number display mode is designated, the process advances to a step H27. In this step H27, the telephone number which has been read from the telephone number memory unit 32 and is being displayed on the display unit 2, is set into the buffer 24. Thereafter, an operation instruction is transferred from CPU 15 to the DTMF signal generating unit 23. As a result, the DTMF signal generating unit 23 is operated and thus, the DTMF signal is generated based upon the telephone number which has been set in the buffer 24, so as to drive the speaker 25 (step H25). As previously described, when the transmission key 8 is operated in the telephone number dispaly mode, the normal dialing operation is executed, not the credit calling operation. If another judgement is made in the previous step H26 that the telephone number display mode is not designated, no dialing operation is carried out but the process advances to the step A1 shown in the flowchart of FIG. 13.

When the numeral keys 4, shift key 5 and the like are operated so as to set the telephone number, judgement results in the steps H1, H7 and H22 become "NO" and the process advances to a step H28 in which a predetermined key process is performed.

Modification of Fourth Paging Receiver

In accordance with the preferred embodiment, the calling information received as the message data my contain not only the telephone number, but also other information for designating the address of the telephone number memory unit 32. As a result, in the latter case, the telephone number is read out by designating the address of the telephone number memory 32, in response to the code contained in the message, the credit calling or normal dialing operation is performed.

In the above-described preferred embodiment, the control information which has been sent from the caller together with the calling information was directly displayed on the display unit. Aoternatively, the received control information may be judged and the display data may be flushed in case that the credit call is permited. It should be noted that the received control information need not be displayed in this case.

While has been described in detail, in the paging receiver equipped with the auto-dialing function according to the fourth preferred embodiment, both the calling information sent as the message information from the caller and also the control information for indicating whether or not the credit call is available are received and stored. While producing the dialing tone corresponding to the telephone number designated by the calling information, if the credit call is allowed based upon the control information, the credit call telephone number is read from the relevant memory, and then the read telephone number is combined with the calling telephone number to output the dialing tone in response to this combined information. To the contrary, if the credit call is not permitted, another dialing tone is output based upon only the calling telephone number. As a consequence, the auto dialing operation can be performed in accordance with the credit call, and also the private use of the credit call can be prohibited.

Basic Idea of Fifth Paging Receiver and Auto-Dialing Apparatus

To accomplish the above-described seventh and eight objects of the invention, a basic idea of a fifth paging receiver will now be described.

The feature of an auto-dialing apparatus according to the fifth preferred embodiment is such that while a calling telephone number is written into a telephone number memory for storing a plurality of calling telephone numbers and of credit call dialing numbers, an identification flag is added thereto for indicating whether or not a credit call is available. In case that a selection is made in the telephone numbers stored in the telephone number memory during the transmission, a judgement is made whether or not the credit call is acceptable based upon the above-decribed identification code attached to this telephone number, whereby either the normal dialing operation, or credit call dialing operation can be executed.

As a result of the identification flag, the credit call is permitted only when a telephone call is made to a callee allowed based on the identification flag, and the credit call is prohibited to other callees who are not permitted.

Also, in accordance with an auto-dialing paging receiver of the fifth perferred embodiment, while a calling telephone number is written into a telephone number is written into a telephone number memory for storing a plurality of calling telephone numbers and of credit call dialing numbers, and identification flag is added thereto for representing whether or a credit call is available, and when a telephone call is made in accordance with a message sent from a caller, a judgement is made whether or not the credit call is permitted, based upon the identificaiton code attached to this telephone number, whereby either a normal dialing operation or a credit call dialing operation is performed.

With the above-described arrangement, when a telephone call is made by the message given by a caller, the credit telephone call can be made only to a callee who is previously allowed to make a telephone call. As a result, the abuse of the credit call by an unauthorized person can be prevented.

Fifth Paging Receiver

Since an outer view of a third paging receiver and an electronic circuit employed therein, and also data formats utilized therein are the same as those of the third paging receiver, no further explanation will be made in the following descriptions.

Memory Regions of Ram 17

Although a major memory region of RMA 17 employed in the fifth auto-dialing type paging receiver is almost the same as that of the third auto-dialing type paging receiver as shown in FIG. 12, the following memory regions are different.

Figure 16:
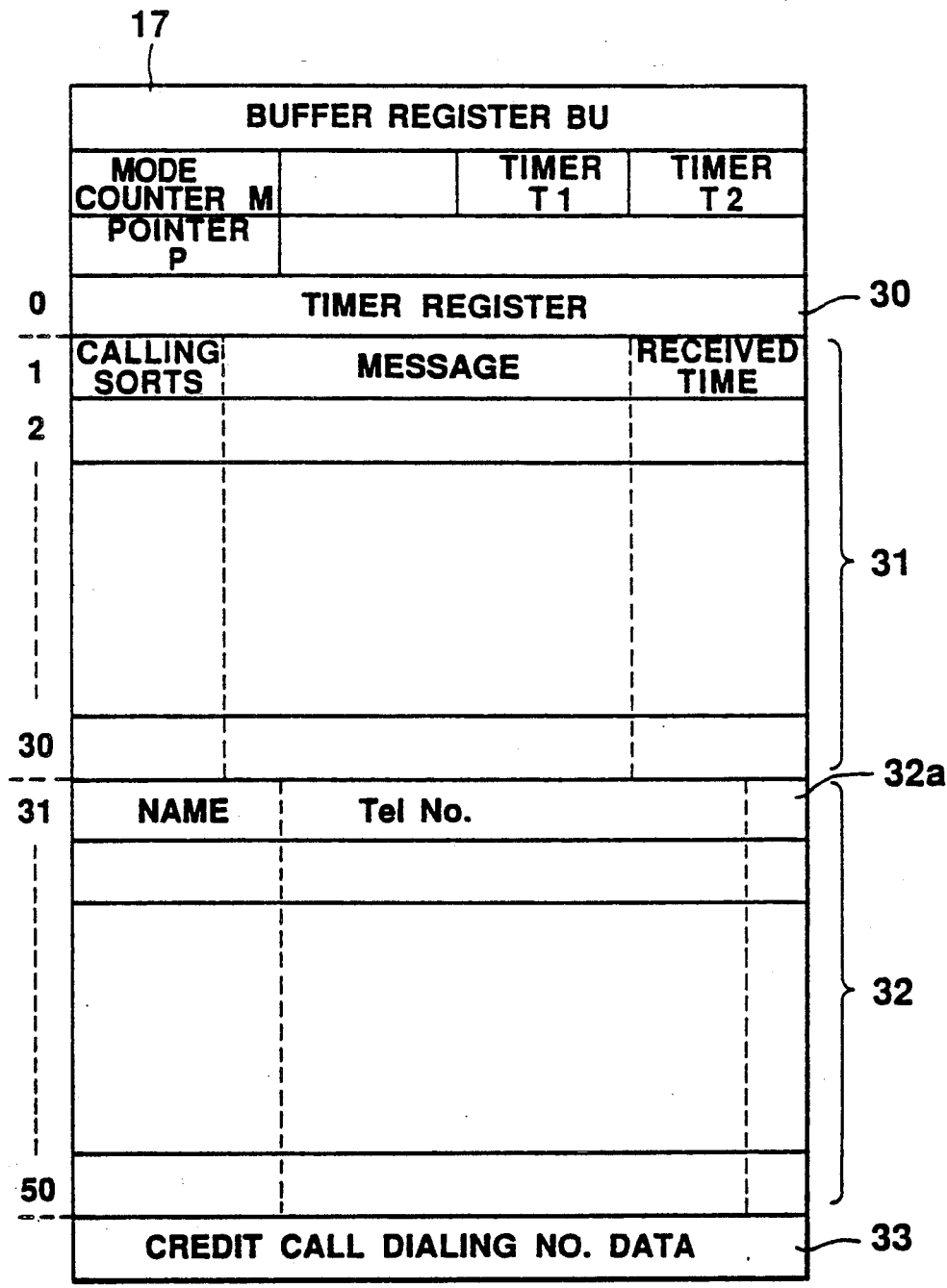
FIG. 16 schematically illustrates memory regions of RAM employed in a paging receiver according to a fifth preferred embodiment of the invention.

That is, as represented in FIG. 16, the telephone number memory 32 is similarly provided from an address of 31 to an address of 50, into which both a telephone number and a name are stored at the respective addresses. These data are entered by the key input unit 16 in the write mode. The different regions are as follows. As the respective address of the telephone number memory 32, a credit call identification flag area 32a is provided for judging whether or not a credit call is available, wherein an identification flag is set while the telephone number is written. In this case, this identification flag my be previously written at a paging receiver lender, e.g., an employee who lends a paging receiver to an employee for the sake of secrecy. When, for instance, the write mode is designated by the mode key 6 so as to write a calling telephone number into the telephone number memory 32, it is possible to set the identification flag to the identification flag area 32 by use of a pass word. When the identification flag becomes "1", the credit call is available, whereas when the identification flag becomes "0", the credit call is prohibited. Also to the credit call memory unit 33, a credit call telephone number is written, into which a stop code has been inserted at a predetermined position. The function of this stop code is to interrupt a generation of a dialing tone for a second dialing tone, or the like for a predetermined time peirod. This credit call telephone number can be previously written by a paging receiver lender, e.g., an employer who lends the paging receiver to an employee, which is similar to the above-described identification flag. After the write mode is designated by the mode key 6, for instance, the address of the credit call memory unit 33 is designated by use of the pass word. Thereafter, the credit call dialing number can be written by the numeral key 4.

Overall Operation of Fifth Paging Reciver

An overall operation of the above-described fifth paging receiver will now be described. A major overall operation of the fifth paging receiver is almost the same as that of the third paging receiver shown in FIG. 13, so that no further explanation is made.

It should be noted that both the calling telephone number and the identification flag for indicating whether or not the credit call is available have been set in the telephone number memory 32 by a caller, and also the credit call telephone number has been written in the credit call memory 33.

ID Flag Processing Operation

When a key operation signal derived from the key input unit 16 shown in FIG. 11 is input into CPU 15, the process advances from the "HALT" condition of the step A1 to the step A23 in which a key process for the ID flag is performed. This ID flag key process will now be described in detail with reference to a flowchart shown in FIGS. 17A and 17B. To display on the display unit 2 the message information stored in the message register unit 31 within RAM 17, the message display mode is designated by the mode key 6, or the read key 7 is operated in the clock mode.

When the key operation is performed under this condition, a judgement is made whether or not the operated key corresponds to the mode key 6 at a step H1. If the mode key 6 is operated, after the count value of the mode counter M is incremented by 1 (step H2), another check is made whether or not the message display mode (mode counter M−1) is selected (step H3). If the message display mode is selected, then "1" is set to the pointer "P" (step H4) and simultaneously the time measuring operation by the second timer T2 is commenced (step H5). Then, the information stored at the address which has been designated by the pointer "P", namely the memory information at the address "1" in this case, i.e., the information on calling sort, message, and received time are read out and displayed on the display unit 2 (step H6). In other words, when the message display mode is designated by the mode key 6, the newest message information which has been finally stored at the address of 1 in the message register unit 31 is displayed on the display unit 2.

When the read key 7 is operated in the clock mode, the process is advanced from the step H1 to a step H7, and a judgement is made whether or not the operated key corresponds to the read key 7. In this case, since the read key 7 is operated, another judgement is performed whether or not the clock mode (M=0) is selected in a further step M8. Since at this time, the clock mode has been designated, the content of the mode counter "M" is incremented by 1, the message display mode is designated (step H9) and also "1" is set to the pointer "P" (step H10). Thereafter, the process advances via the above-described step B5 (i.e., to start the timer T2) to the step H6, and as previously described, the message information which has been stored at the address of 1 in the message register unit 31 is displayed on the display unit 2.

When the subsequent message is displayed under such a condition that the above-described message information is being displayed, then the read key 7 is operated. When this read key 7 is operated, the process advances to a step H11 via the steps H1, H7 and H8, in which a judgement is made whether or not the message display mode is designated. In this case, as previously explained, since the message display mode has been designated, the pointer "P" is incremented by 1 (step H12) and thereafter, whether the incremented value thereof reaches 31 is checked (step H13). If the value of the pointer "P" does not yet reach 31, the process advances via the step H5 to the step H6 in which the above-described message is processed. In other words, the information stored in the message register unit 31 which is designated by the value of the pointer "P" is read out and then displayed on the display unit 2. Similarly, every time the read key 7 is operated, the value of the pointer "P" is incremented by 1, the designated address for the message register unit 31 is updated, the message information stored in the message register unit 31 is successively read to be displayed on the display unit 2. When the value of the pointer "P" by operating the read key 7 exceeds over the final address (i.e., address of 30) of the message register unit 31, this condition is detected at a step H13. Then, "1" is set to the pointer "P" in the subsequent step H14. As a result, the designated address of the message register unit 31 is returned to the first address of "1" and the information stored at this address is displayed on the display unit 2. As previously described, the various information stored in the message register unit 31 is sequentially displayed on the display unit 2 by operating the read key 7. In such a specific case that no key is operated under this message display condition, when the time measurement by the second timer T2 is performed for 30 seconds, the process is returned to the clock mode.

When the telephone number stored in the telephone number memory 32 of RAM 17 is displayed on the display unit, the telephone number display mode is designated by the mode key 6. When the mode key 6 is operated to designate the telephone number display mode, the process advances via the step H1, and H2 to the step H3, in which a judgement is made whether or not the message display mode is designated. In this case, since the telephone number display mode has been designated, the judgement result of the step H3 is "NO". Then, the process is advanced to a step H15, in which a judgement is made whether or not the telephone number display mode or telephone number write mode is designated. When the telephone number display mode, or telephone number write mode is designated, "31" is set to the pointer "P" in the subsequent step H16. Thereafter, the process advances from the step H5 to the step H6 so that the display process is performed. In other words, when the address of "31" of the telephone number memory unit 32 is designated by the pointer "P", the name telephone number and identification flag which have been stored at this address of 31 are read out via CPU 15 to the display buffer 20, so that the name is displayed on the upper display area 2a on the display unit 2, whereas the telephone number is displayed on the lower display area 2b thereof.

At this time, CPU 15 judges whether or not the identification flag is equal to "1". If yes, then the displayed information is flushed so as to announce that the telephone number displayed on the display unit is available for the credit calling operation.

Then, when other telephone number which has been stored in the telephone number memory unit 32 is read out so as to be displayed on the display unit 2, the read key 7 is operated under this condition. When this read key 7 is operated, the process advances via the steps H1, H7, and H8 to the step H11, in which a judgement is made whether or not the message display mode is designated. In this case, since the message display mode is not designated, a judgement result becomes "NO" and then the process advances to a step H17. Then, the value of the pointer "P" is incremented by 1. Thereafter, a check is made whether or not the incremented value of the pointer "P" reaches "51", namely whether or not the value of the pointer "P" exceeds over the last address of the telephone number memory 32. If not exceeds over the last address, the process advances via the step H5 to the step H6. In this step H6, the information stored in the telephone number memory unit 32 which is designated by the value of the pointer "P", is read and displayed on the display unit 2. As previously described, in this telephone number display mode, the value of the pointer is incremented by 1 every time the read key 7 is operated, and both the name and telephone number which have been stored in the telephone number memory unit 32 are sequentially read so as to be displayed on the display unit 2. If the value of the pointer "P" exceeds over the last address (i.e., address of 50) of the telephone number memory unit 32 and reaches the address of 51 while operating the read key 7, this condition is detected in a step H18. Then, "31" is set to the value of the pointer "P" in the next step H19. As a result, the address designation of the telephone number memory unit 32 is returned to the first address, and thus the information stored at this address is read to be displayed on the display unit 2.

Also in the telephone number write mode, the information stored in the telephone number memory unit 32 is displayed on the display unit 2, which is similar to the telephone number display mode. In accordance with this telephone number write mode, after the displayed content is corrected or rewritten by operating the numeral key 4, resultant content may be written into the corresponding address of the telephone number memory unit 32.

When the mode key 6 is operated to change either the message display mode or telephone number display mode into the clock mode, the judgement results in the steps H3 and H15 become "NO", and the process advances to a step H20 in which "0" is set to the value of the pointer "P". Thereafter the second timer T2 is turned off (step H21), and the process is returned to the display process defined by the previous step H6. As a result, the address of "0" of the timer register 30 is designated by the pointer "P", and the timer information stored at the address of "0" is read out to the display buffer 20 and then displayed on the display unit 2.

Auto-Dialing Operation of Fifth Paging Receiver

In case of the auto-dialing operation, either the message display mode or telephone display mode is designated and the transmission key 8 is operated under the condition that a telephone number to be called is displayed on the display unit 2. More specifically, in case that a credit call is utilized, a desired telephone number is selected and displayed on the display unit 2 in the telephone number display mode. Upon this display condition, namely whether a display flushing is present or not, a confirmation is made whether or not the credit call is available. Thereafter, the transmission key 8 is operated.

Figure 17A:
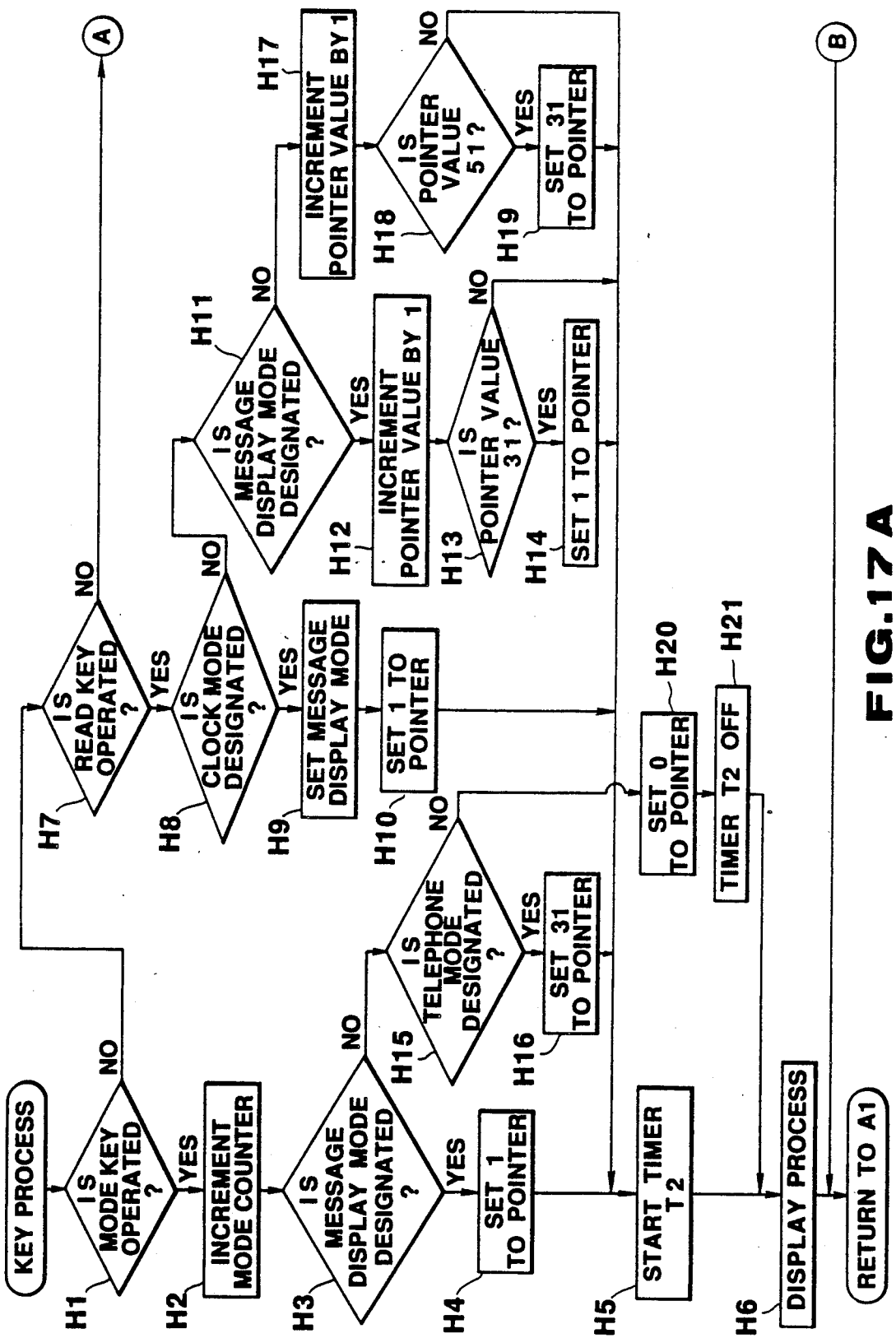
FIGS. 17A and 17B are flowcharts for explaining an ID flag processing operation effected by the fifth paging receiver.
Figure 17B:
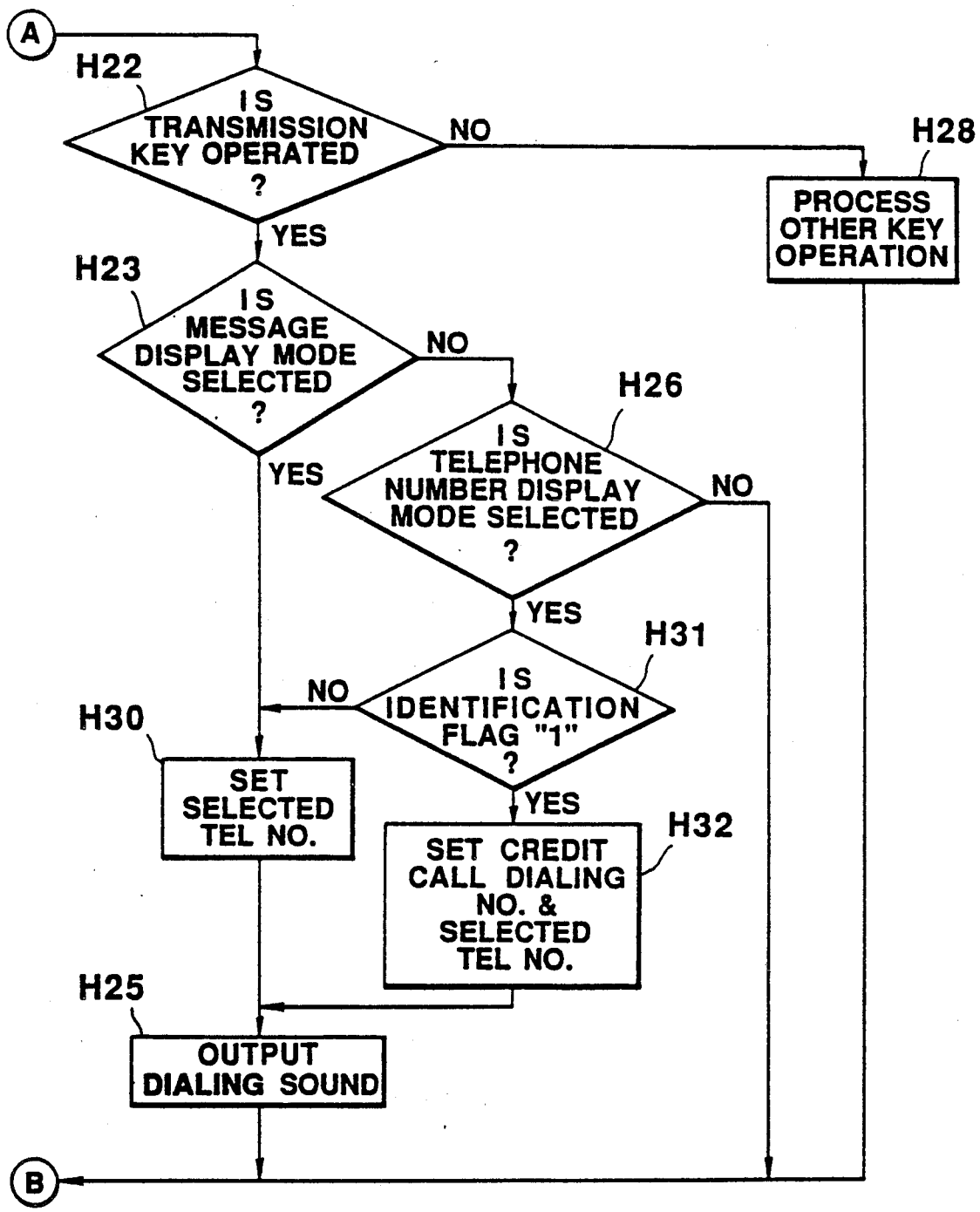

When this transmission key 8 is manipulated, the judgement results of the steps H1 and H7 in the flowchart shown in FIG. 17A are both "NO", and then the process advances to a step H22, in which a judgement is made whether or not the transmission key 8 is operated. If the transmission key 8 is operated, another judgement is made whether or not the message display mode is designated in a step H23. When the message display mode is designated, the telephone number portion after received message data displayed on the display unit 2 is set into the buffer 24 (step H30). Therefore, an operation instruction is sent from CPU 15 to the DTMF signal generating unit 23. As a result, the DTMF signal generating unit 23 is activated to produce the DTMF signal in accordance with the telephone number which has set in the buffer 24, so that the speaker 25 is driven (step H15). When the dialing operation is accomplished, the DTMF signal generating unit 23 outputs an end signal to CPU 15. In case that the transmission key 8 is operated in the above-described message display mode, the normal dialing operation is performed without utilizing the credit call.

If a judgement is made in the previous step H23 that no message display mode is designated, another judgement is made whether or not the telephone number display mode is designated (step H26). If the telephone number display mode is designated, a judgement is made whether or not the identification flag is equal to 1, which corresponds to the telephone number which has been read from the telephone number memory unit 32 and is being displayed on the display unit in this case (step H31). If the identification flag is not equal to "1", namely if the credit call is not allowed, the process advances to the previous step H30. In this step H30, the normal dialing operation for the telephone number displayed on the display unit 2 is carried out. To the contrary, if a judgement is made that the identification flag is equal to "1", as represented in a step H32, the credit call dialing number which has been stored in the credit call telephone number memory 33 is read from RAM 17 to CPU 15. Then, the readout credit call dialing number is combined with the telephone number displayed on the display unit 2 and set into the buffer 24. Simultaneously, an operation instruction is transferred from CPU 15 to the DTMF signal generating unit 23. As a result, the DTMF signal generating unit 23 is operated so as to produce the DTMF (dual tone multi-frequency) signal in response to the credit call and the calling telephone number, whereby the speaker 25 is driven (step H25). As previously described, only when the identification flag "1" is set to the identification flag area 32a of the telephone number memory 32, the credit call is permitted. If a judgement is made in the previous step H26 that the telephone number display mode is not designated, no dialing operation is carried out but the process advances to the step A1 shown in the flowchart of FIG. 13.

When the numeral keys 4, shift key 5 and the like are operated so as to set the telephone number, judgement results in the steps H1, H7 and H22 become "NO" and the process advances to a step H28 in which a predetermined key process is performed.

Modifications of Fifth Paging Receiver

In accordance with the fifth preferred embodiment, the paging receiver equipped with the auto-dialing function was described. Also, the present invention may be applied to an auto-dialing apparatus capable of generating a dialing sound based upon a telephone number stored in the telephone number memory. It should be noted that an arrangement of the typical auto-dialing apparatus is equal to the arrangement of the fifth paging receiver from which the antenna 11, receiver unit 12, decoder unit 13, ID-ROM 14 and the like have been omitted.

While has been described in detail, according to the fifth preferred embodiment, in the auto-dialing apparatus and paging receiver equipped with the auto-dialing function, when the above-described calling telephone number is written into the telephone number memory for storing the credit call dialing number, the identification flag for indicating whether or not the credit call is available is added. In case that a selection is made on the telephone number stored in the telephone number memory during the transmission operation, a judgement can be made whether or not the credit call is available based upon the identification code which has been attached to this telephone number, whereby either the normal dialing operation or credit call dialing operation can be performed. As a consequence, the dialing operation made by the credit call can be realized only for a predetermined callee. The credit call is prohibited to an authorized telephone number. Thus, the abuse of the credit call can be surely prevented.

Basic Idea of Sixth Paging Receiver

To accomplish the above-described third to eight objects of the invention, a basic idea of a sixth paging receiver will now be described.

In accordance with an auto-dialing paging receiver of the sixth preferred embodiment, while a calling telephone number is written into a telephone number memory for storing a plurality of calling telephone numbers and of credit call telephone numbers, and identification flag is added thereto for representing whether or a credit call is available, and when a telephone call is made in accordance with a calling information, i.e. an address code of the telephone number memory and the like, sent from a calling as a message, a judgement is made whether or not the credit call is permitted, based upon the identification code attached to this telephone number, whereby either a normal dialing operation or a credit call dialing operation is performed.

With the above-described arrangement, when a telephone call is made by the message given by a caller, the credit telephone call can be made only to a callee who is previously allowed to make a telephone call. As a result, the abuse of the credit call by an unauthorized person can be prevented.

Sixth Paging Receiver

It should be noted that since an outer view of a sixth paging receiver, an electronic circuit employed therein, data formats utilized therein, and also memory regions of RAM in this electronic circuit thereof are the same as those of the fifth paging receiver, no detailed explanation thereto will be made in the following descriptions.

Overall Operation of Sixth Paging Reciver

An overall operation of the above-described sixth paging receiver will now be described as follows. Since the major operation of the sixth paging receiver is very similar to that of the fifth paging receiver, no further explanation thereof is made in the following descriptions.

It should be noted that only different operations will be explained. That is, the message information sent from the above-described caller contains an address code of the telephone number memory as a calling information. The address code consist, for instant, a double symbol codes "EE" and two digits numeric code. Two pieces of "F" codes consisting of hexadecimal numeral represents that the subsequent two digits numeric code is an address data of the telephone number memory.

Address Code Processing Operation

Figure 18A:
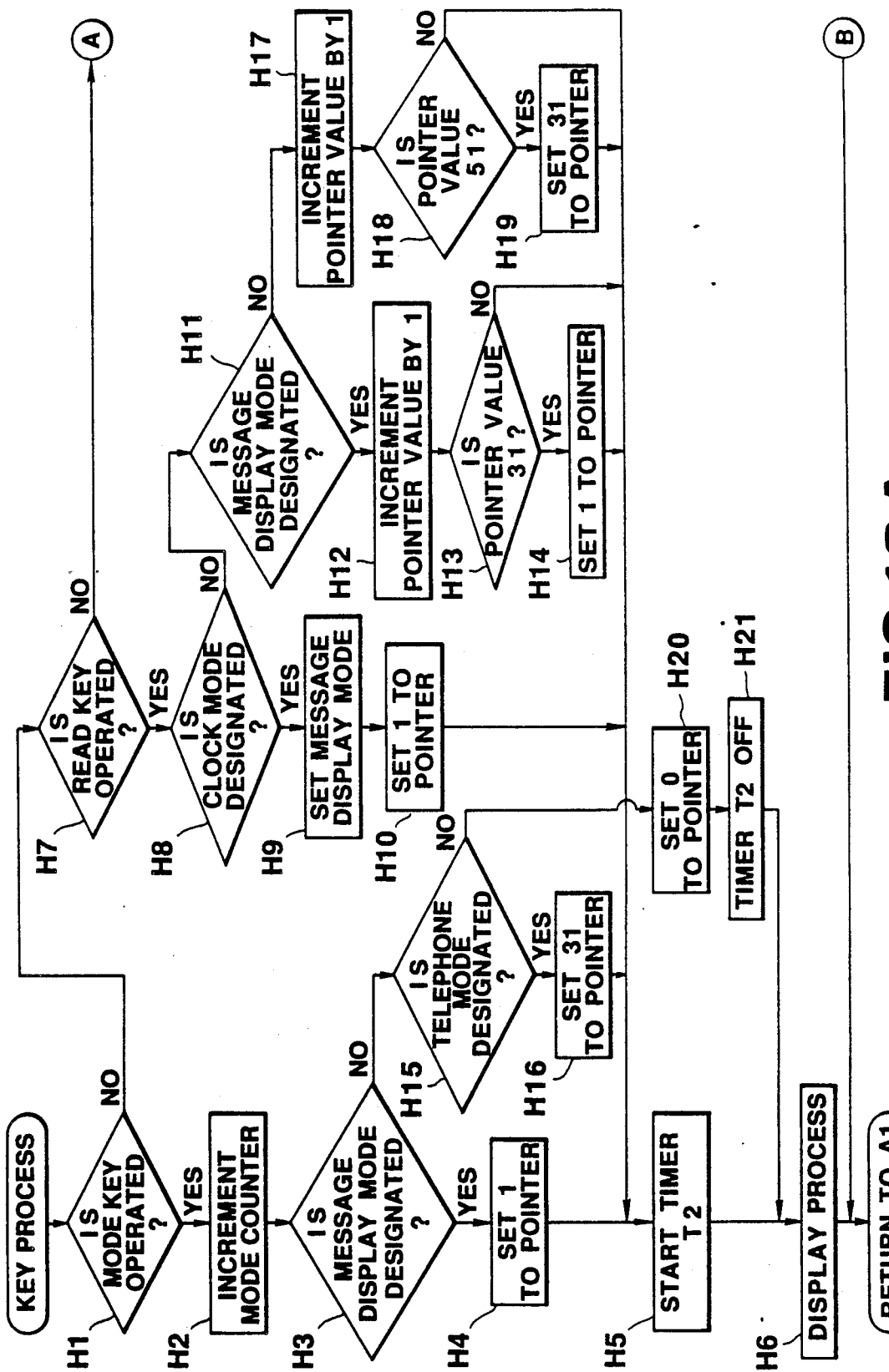
FIGS. 18A and 18B are flowcharts for explaining an ID flag processing operation performed in a paging receiver according to a sixth preferred embodiment of the invention.
Figure 18B:
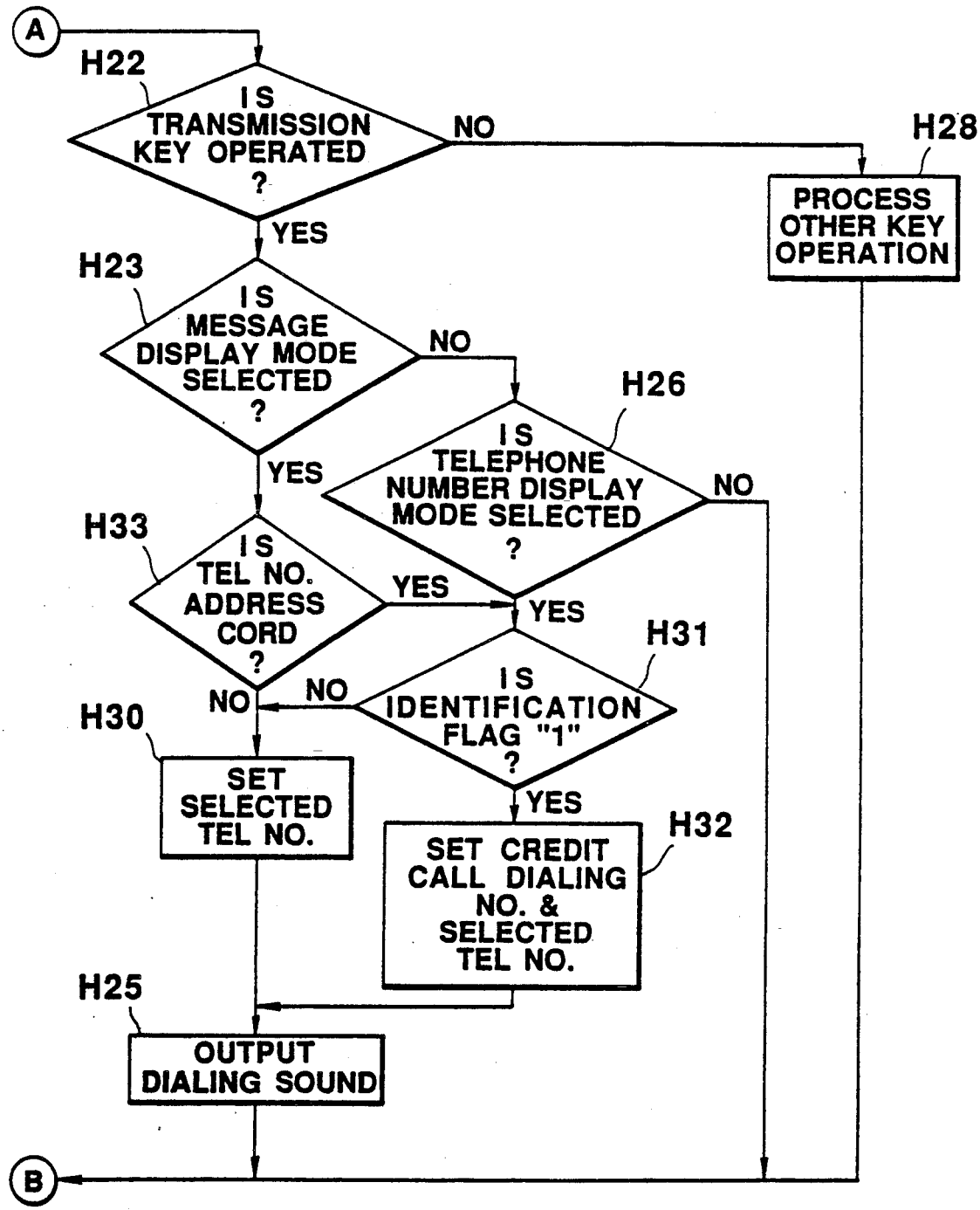

When a key operation signal derived from the key input unit 16 shown in FIG. 11 is input into CPU 15, the process advances from the "HALT" condition of the step A1 to the step A23 in which a key process for the address code is performed. This address code key process will now be described in detail with reference to a flowchart shown in FIGS. 18A and 18B. To display on the display unit 2 the message information stored in the message register unit 31 within RAM 17, the message display mode is designated by the mode key 6, or the read key 7 is operated in the clock mode.

When the key operation is performed under this condition, a judgement is made whether or not the operated key corresponds to the mode key 6 at a step H1. If the mode key 6 is operated, after the count value of the mode counter M is incremented by 1 (step H2), another check is made whether or not the message display mode (mode counter M=1) is selected (step H3). If the message display mode is selected, then "1" is set to the pointer "P" (step H4) and simultaneously the time measuring operation by the second timer T2 is commenced (step H5). Then, the information stored at the address which has been designated by the pointer "P", namely the memory information at the address "1" in this case, i.e., the information on calling sort, message, and received time are read out and displayed on the display unit 2 (step H6). In other words, when the message display mode is designated by the mode key 6, the newest message information which has been finally stored at the address of 1 in the message register unit 31 is displayed on the display unit 2.

When the read key 7 is operated in the clock mode, the process is advanced from the step H1 to a step H7, and a judgement is made whether or not the operated key corresponds to the read key 7. In this case, since the read key 7 is operated, another judgement is performed whether or not the clock mode (M=0) is selected in a further step H8. Since at this time, the clock mode has been designated, the content of the mode counter "M" is incremented by 1, the message display mode is designated (step H9) and also "1" is set to the pointer "P" (step H10). Thereafter, the process advances via the above-described step H5 (i.e., to start the timer T2) to the step H6, and as previously described, the message information which has been stored at the address of 1 in the message register unit 31 is displayed on the display unit 2.

When the subsequent message is displayed under such a condition that the above-described message information is being displayed, then the read key 7 is operated. When this read key 7 is operated, the process advances to a step H11 via the steps H1, H7 and H8, in which a judgement is made whether or not the message display mode is designated. In this case, as previously explained, since the message display mode has been designated, the pointer "P" is incremented by 1 (step H12) and thereafter, whether the incremented value thereof reaches 31 is checked (step H13). If the value of the pointer "P" does not yet reach 31, the process advances via the step H5 to the step H6 in which the above-described message is processed. In other words, the information stored in the message register unit 31 which is designated by the value of the pointer "P" is read out and then displayed on the display unit 2. Similarly, every time the read key 7 is operated, the value of the pointer "P" is incremented by 1, the designated address for the message register unit 31 is updated, the message information stored in the message register unit 31 is successively read to be displayed on the display unit 2. When the value of the pointer "P" by operating the read key 7 exceeds over the final address (i.e., address of 30) of the message register unit 31, this condition is detected at a step H13. Then, "1" is set to the pointer "P" in the subsequent step H14. As a result, the designated address of the message register unit 31 is returned to the first address of "1+ and the information stored at this address is displayed on the display unit 2. As previously described, the various information stored in the message register unit 31 is sequentially displayed on the display unit 2 by operating the read key 7. In such a specific case that no key is operated under this message display condition, when the time measurement by the second timer T2 is performed for 30 seconds, the process is returned to the clock mode.

When the telephone number stored in the telephone number memory 32 of RAM 17 is displayed on the display unit, the telephone number display mode is designated by the mode key 6. When the mode key 6 is operated to designate the telephone number display mode, the process advances via the step H1, and H2 to the step H3, in which a judgement is made whether or not the message display mode is designated. In this case, since the telephone number display mode has been designated, the judgement result of the step H3 is "NO". Then, the process is advanced to a step H15, in which a judgement is made whether or not the telephone number display mode or telephone number write mode is designated. When the telephone number display mode, or telephone number write mode is designated, "31" is set to the pointer "P" in the subsequent step H16. Thereafter, the process advances from the step H5 to the step H6 so that the display process is performed. In other words, when the address of "31" of the telephone number memory unit 32 is designated by the pointer "P", the name telephone number and identification flag which have been stored at this address of 31 are read out via CPU 15 to the display buffer 20, so that the name is displayed on the upper display area 2a on the display unit 2, whereas the telephone number is displayed on the lower display area 2b thereof.

At this time, CPU 15 judges whether or not the identification flag is equal to "1". If yes, then the displayed information is flushed so as to announce that the telephone number displayed on the display unit is available for the credit calling operation.

Then, when other telephone number which has been stored in the telephone number memory unit 32 is read out so as to be displayed on the display unit 2, the read key 7 is operated under this condition. When this read key 7 is operated, the process advances via the steps H1, H7, and H8 to the step H11, in which a judgement is made whether or not the message display mode is designated. In this case, since the message display mode is not designated, a judgement result becomes "NO" and then the process advances to a step H17. Then, the value of the pointer "P" is incremented by 1. Thereafter, a check is made whether or not the incremented value of the pointer "P" reaches "51", namely whether or not the value of the pointer "P" exceeds over the last address of the telephone number memory 32. If not exceeds over the last address, the process advances via the step H5 to the step H6. In this step H6, the information stored in the telephone number memory unit 32 which is designated by the value of the pointer "P", is read and displayed on the display unit 2. As previously described, in this telephone number display mode, the value of the pointer is incremented by 1 every time the read key 7 is operated, and both the name and telephone number which have been stored in the telephone number memory unit 32 are sequentially read so as to be displayed on the display unit 2. If the value of the pointer "P" exceeds over the last address (i.e., address of 50) of the telephone number memory unit 32 and reaches the address of 51 while operating the read key 7, this condition is detected in a step H18. Then, "31" is set to the value of the pointer "P" in the next step H19. As a result, the address designation of the telephone number memory unit 32 is returned to the first address, and thus the information stored at this address is read to be displayed on the display unit 2.

Also in the telephone number write mode, the information stored in the telephone number memory unit 32 is displayed on the display unit 2, which is similar to the telephone number display mode. In accordance with this telephone number write mode, after the displayed content is corrected or rewritten by operating the numeral key 4, resultant content may be written into the corresponding address of the telephone number memory unit 32. A key process for setting this telephone number is carried out a step H28 (will be discussed later).

When the mode key 6 is operated to change either the message display mode or telephone number display mode into the clock mode, the judgement results in the steps H3 and H15 become "NO", and the process advances to a step H20 in which "0" is set to the value of the pointer "P". Thereafter the second timer T2 is turned off (step H21), and the process is returned to the display process defined by the previous step H6. As a result, the address of "0" of the timer register 30 is designated by the pointer "P", and the timer information stored at the address of "0" is read out to the display buffer 20 and then displayed on the display unit 2.

Auto-Dialing Operation of Sixth Paging Receiver

In case of the auto-dialing operation, either the message display mode or telephone display mode is designated and the transmission key 8 is operated under the condition that a telephone number to be called is displayed on the display unit 2. More specifically, in case that a credit call is utilized, a desired telephone number is selected and displayed on the display unit 2 in the telephone number display mode. Upon this display condition, namely whether a display flushing is present or not, a confirmation is made whether or not the credit call is available. Thereafter, the transmission key 8 is operated.

When this transmission key 8 is manipulated, the judgement results of the steps H1 and H7 in the flowchart shown in FIG. 17A are both "NO", and then the process advances to a step H22, in which a judgement is made whether or not the transmission key 8 is operated. If the transmission key 8 is operated, another judgement is made whether or not the message display mode is designated in a step H23. When the message display mode is designated, another judgement is made whether or not a address code for designating a telephone number stored in the telephone number memory is contained (step H33). If no, then the telephone number portion of the received message data displayed on the display unit 2 is set into the buffer 24 (step H30). Therefore, an operation instruction is sent from CPU 15 to the DTMF signal generating unit 23. As a result, the DTMF signal generating unit 23 is activated to produce the DTMF signal in accordance with the telephone number which has set in the buffer 24, so that the speaker 25 is driven (step H25). When the dialing operation is accomplished, the DTMF signal generating unit 23 outputs an end signal to CPU 15. In case that the transmission key 8 is operated in the above-described message display mode, the normal dialing operation is performed without utilizing the credit call.

In the previous step H33, if yes, a another judgement is made whether or not the identification flag is equal to 1, which corresponds to the telephone number which has been stored in the telephone number memory unit 32 and is designated by the address code (step H31). If the identification flag is not equal to "1", namely if the credit call is not allowed, the process advances to the previous step H30. In this step H30, the normal dialing operation for the telephone number displayed on the display unit 2 is carried out. To the contrary, if a judgement is made that the identification flag is equal to "1", as represented in a step H32, the credit call dialing number which has been stored in the credit call telephone number memory 33 and the designated telephone number which has been stored in the telephone number memory 32 are read from RAM 17 to CPU 15. Then, the readout credit call dialing number is combined with the readout telephone number and set into the buffer 24. Simultaneously, an operation instruction is transferred from CPU 15 to the DTMF signal generating unit 23. As a result, the DTMF signal generating unit 23 is operated so as to produce the DTMF (dual tone multi-frquency) signal in response to the credit call and the calling telephone number, whereby the speaker 25 is driven (step H25). As previously described, only when the identification flag "1" is set to the identification flag area 21a of the telephone number memory 32, the credit call is permitted.

If a judgement is made in the previous step H23 that no message display mode is designated, another judgement is made whether or not the telephone number display mode is designated (step H26). If the telephone number display mode is designated, a judgement is made whether or not the identification flag is equal to 1, which corresponds to the telephone number which has been read from the telephone number memory unit 32 and is being displayed on the display unit in this case (step H31). If the identification flag is not equal to "1", namely if the credit call is not allowed, the process advances to the previous step H30. In this step H30, the normal dialing operation for the telephone number displayed on the display unit 2 is carried out. To the contrary, if a judgement is made that the identification flag is equal to "1", as represented in a step H32, the credit call dialing number which has been stored in the credit call telephone number memory 33 is read from RAM 17 to CPU 15. Then, the readout credit call dialing number is combined with the telephone number displayed on the display unit 2 and set into the buffer 24. Simultaneously, an operation instruction is transferred from CPU 15 to the DTMF signal generating unit 23. As a result, the DTMF signal generating unit 23 is operated so as to produce the DTMF (dual tone multi-frequency) signal in response to the credit call and the calling telephone number, whereby the speaker 25 is driven (step H25). As previously described, only when the identification flag "1" is set to the identification flag area 32a of the telephone number memory 32, the credit call is permitted. If a judgement is made in the previous step H26 that the telephone number display mode is not designated, no dialing operation is carried out but the process advances to the step A1 shown in the flowchart of FIG. 13.

When the numeral keys 4, shift key 5 and the like are operated so as to set the telephone number, judgement results in the steps H1, H7 and H22 become "NO" and the process advances to a step H28 in which a predetermined key process is performed.

While has been described in detail, according to the sixth preferred embodiment, in the paging receiver equipped with the auto-dialing function, when the above-described calling telephone number is written into the telephone number memory for storing the credit call dialing number, the identification flag for indicating whether or not the credit call is available is added. In case that a selection is made on the received message data which contains a telephone number memory address code during the transmission operation, a judgement can be made whether or not the credit call is available based upon the identification code which has been attached to this telephone number, whereby either the normal dialing operation or credit call dialing operation made by the credit call can be realized only for a predetermined callee. The credit call is prohibited to an authorized telephone number. Thus, the abuse of the credit call can be surely prevented.

What is claimed is:

1. An auto-dialing type paging receiver, comprising:
   receiving means for receiving message data, the message data including at least telephone number data and numeral data other than the telephone number data;
   storage means for storing the message data received by the receiving means;
   readout means for reading out the message data from the storage means;
   display means for displaying the message data read out from the storage means;
   selection means for selecting only the telephone number data from the message data displayed on the display means; and
   dialing-tone generating means for converting the telephone number data selected by the selection means into a corresponding telephone number dialing tone and for outputting the telephone number dialing tone to a telephone handset.

2. An auto-dialing type paging receiver as claimed in claim 1, wherein said selection means includes:
   a manually operable switch; and
   means for selecting an arbitrary data portion contained in the message data displayed on the display means, by manually manipulating the manually operable switch.

3. An auto-dialing type paging receiver as claimed in claim 1, wherein said selection means includes:
   detecting means for detecting a specific code contained in the message data displayed on said display means; and
   means for selecting a specific portion of the data contained in the message data in response to said specific code detected by said detecting means.

4. An auto-dialing type paging receiver as claimed in claim 3, wherein:
said specific code corresponds to an abbreviated number designating a predetermined message phrase where a telephone number is present as a parameter; and
said means for selecting selects a data portion corresponding to said telephone number data contained in said message data in response to said abbreviated number corresponding to said predetermined message phrase detected by said detecting means.

5. An auto-dialing type paging receiver as claimed in claim 1, wherein:
a message phrase memory means is provided for storing a plurality of predetermined message phrases;
first detecting means is provided for detecting an abbreviated number to designate a predetermined message phrase which has been stored in said message phrase memory means, from said message data read by said readout means; and
said display means includes means for reading and displaying said predetermined message phrase corresponding to said abbreviated number from said message phrase memory means when said abbreviated number corresponding to said predetermined message phrase is detected by said first detecting means; and
said selection means includes:
said detecting means which detects the abbreviated number of said predetermined message phrase to designate the predetermined message phrase where a telephone number is present as a parameter; and
means for selecting a data portion corresponding to said telephone number data contained in said message data in response to the abbreviated number of said predetermined message phrase detected by said detecting means.

6. An auto-dialing type paging receiver as claimed in claim 5, wherein said selection means further includes means for selecting all of the data portion contained in the message data when said abbreviated number of the predetermined message phrase is not detected by said detecting means.

7. An auto-dialing type paging receiver, comprising:
receiving means for receiving message data, the message data including at least telephone number data and numeral data other than the telephone number data;
message data storage means for storing the message data received by the receiving means;
message phrase memory means for storing a plurality of predetermined message phrases;
readout means for reading out the message data from the message data storage means;
display means for displaying the message data read by the readout means;
first detecting means for detecting an abbreviated number to designate the predetermined message phrase which has been stored in the message phrase memory means from the read message data;
means for reading the predetermined message phrase corresponding to the detected abbreviated number from the message phrase memory means when the abbreviated number corresponding to the predetermined message phrase is detected by the first detecting means;
dialing-tone generating means for converting a numeral data of said message data into a corresponding dialing tone;
means for instructing a generation of the dialing tone;
said detecting means detecting a specific abbreviated number for designating a predetermined message phrase where a telephone number is present as a parameter, from the message data displayed on the display means in response to an output of the instructing means; and
dialing-data selecting means for selectively outputting to said dialing-tone generating means, a data portion contained in the message data corresponding to the telephone number data, when said specific abbreviated number of said predetermined message phrase is detected by said detecting means, and all of the data portion contained in the message data when said specific abbreviated number of said predetermined message phrase is not detected by said detecting means.

8. An auto-dialing type paging receiver comprising:
receiving means for receiving message data, the message data including at least telephone number data and numeral data other than the telephone number data;
message data storage means for storing the message data received by the receiving means;
message phrase memory means for storing a plurality of predetermined message phrases;
telephone number memory means for storing a plurality of telephone numbers;
readout means for reading out the message data from the message data storage means;
display means for displaying the message data read by the readout means;
detecting means for detecting an abbreviated number to designate the predetermined message phrase which has been stored in the message phrase memory means from the read message data;
means for reading the predetermined message phrase corresponding to the detected abbreviated number of the predetermined message phrase from the message phrase memory means when the abbreviated number corresponding to said predetermined message phrase is detected by the detecting means;
dialing-tone generating means for converting a numeral data into a corresponding dialing tone;
means for instructing a generation of the dialing tone; and
dialing-data selection means for detecting a specific code contained in the message data displayed on the display means in response to operation of the instructions means, and for selecting data to be dialed based upon a result of the detection by said dialing-data selecting means, whereby said selected data is transferred to the dialing-tone generating means.

9. An auto-dialing type paging receiver as claimed in claim 8, wherein said specific code corresponds to the abbreviated number of the predetermined message phrase for selectively designating the predetermined message phrase stored in said message phrase memory means.

10. An auto-dialing type paging receiver as claimed in claim 8, wherein
said specific code corresponds to a specific abbreviated number of a predetermined message phrase for selectively designating a predetermined message phrase by which a predetermined caller is required for communications; and said dialing-data selecting means including means for reading a predetermined telephone number from said telephone number memory means so as to be output to said dialing-tone generating means when said specific abbreviated number corresponding to said predetermined message phrase is detected.

11. An auto-dialing type paging receiver as claimed in claim 8, wherein:

said specific code corresponds to a abbreviated number corresponding to a predetermined message phrase stored in said message phrase memory means; and said dialing-data selecting means outputs a telephone number portion contained in said message data or telephone number data stored in the telephone number memory means to said dialing-tone generating means based upon the detected abbreviated number of said predetermined message phrase.

12. An auto-dialing type paging receiver as claimed in claim 8, wherein said specific code corresponds to a code for designating an address of said telephone number memory means.

13. An auto-dialing type paging receiver, comprising:

receiving means for receiving message data, the message data including at least telephone number data and numeral data other than the telephone number data;

storage means for storing the message data received by the receiving means;

telephone number memory means for storing a plurality of telephone numbers;

readout means for reading out the message data from the storage means;

display means for displaying the message data read by the readout means;

dialing-tone generating means for converting a numeral data into a corresponding dialing tone;

means for instructing a generation of the dialing tone; and dialing-tone selecting means for detecting a specific code contained in the message data displayed on said display means in response to operation of said instruction means, and for outputting specific data corresponding to each of detecting results to said dialing-tone generating means.

14. An auto-dialing type paging receiver as claimed in claim 13, wherein said specific code corresponds to a code for designating an address of said telephone number memory means.

15. An auto-dialing type paging receiver, comprising:

receiving means for receiving message data, the message data including at least telephone number data and numeral data other than the telephone number data;

storage means for storing the message data received by the receiving means;

telephone number memory means for storing cashless telephone dialing number data for enabling at least a cashless telephone communication;

readout means for reading out the message data from the storage means;

display means for displaying the message data read by the readout means;

dialing-tone generating means for converting a numeral data into a corresponding dialing tone;

means for instructing a generation of the dialing tone; and output means for outputting both the telephone number data contained in the message data displayed on the display means and the cashless telephone dialing number stored in the telephone number memory means to said dialing-tone generating means in response to operation of said instruction means.

16. An auto-dialing type paging receiver as claimed in claim 15, wherein said output means includes means for detecting a specific code contained in the message data, said dialing number data being output only when said specific code is detected.

17. An auto-dialing type paging receiver as claimed in claim 15 including means for detecting a specific code contained in the message data, and represents that a cashless communication can be performed only when said specific code is detected; and said output means outputs said dialing number data only when said specific code is detected.

18. An auto-dialing type paging receiver, comprising:

receiving means for receiving message data, the message data including at least telephone number data and numeral data other than the telephone number data;

storage means for storing the message data received by the receiving means;

telephone number memory means for storing both a plurality of telephone numbers and a cashless telephone dialing number data for enabling a cashless telephone communication;

readout means for reading out the message data from said storage means;

display means for displaying the message data read by said readout means;

dialing-tone generating means for converting a numeral data into a corresponding dialing tone;

means for instructing a generation of the dialing tone by the dialing-tone generating means; and output means for detecting the telephone number memory designating code contained in the message data displayed on said display means in response to operation of said instruction means, whereby both a corresponding telephone number data and said cashless telephone dialing number are read out from said telephone number memory means and supplied to said dialing-tone generating means.

19. An auto-dialing type paging receiver as claimed in claim 18, wherein:

said output means includes means for detecting a specific code contained in the message data; and said dialing number data is output to the dialing-tone output means only when said specific code is detected.

20. An auto-dialing type paging receiver as claimed in claim 18, including:

means for detecting a specific code contained in the message data and for representing that a cashless communication is possible when said specific code is detected; and said output means includes means for outputting said dialing number data to the dialing-tone output means only when said specific code is detected.

21. An auto-dialing type paging receiver as claimed in claim 18, wherein in accordance with each of said plural telephone numbers, identification information representing whether or not a cashless communication is available is stored into said telephone number memory means, and said output means reads both the corresponding telephone number and cashless telephone dialing number from the telephone number memory means so as to be output to said dialing-tone generating means only when the detected telephone number memory designating code corresponds to a code for instructing a telephone number by which the cashless communication is permitted by said identification information.

22. An auto-dialing type paging receiver as claimed in claim 21, wherein said display means includes means for representing that the cashless communication is allowed based upon identification information added to the telephone number.

23. An auto-dialing apparatus, comprising:
a telephone number memory means for storing both a cashless telephone dialing number data for a cashless telephone communication and a plurality of telephone number data, and wherein identification information indicating whether cashless communication is available or not is attached to each of said telephone number data;
readout means for reading out the telephone number data from said telephone number memory means;
display means for displaying the telephone number data read by said readout means;
dialing-tone generating means for converting the telephone number data into a corresponding dialing tone;
means for instructing a generation of the dialing tone; and
judging means for judging whether a cashless communication is permitted or not by the identification information attached to the telephone number data displayed on said display means in response to operation of the instruction means, and for selecting, based upon the judgement result of the judging means, as data to be output to said dialing-tone generating means, only the telephone number data stored into said telephone number memory means, or both the telephone number data and dialing number data.

24. An auto-dialing apparatus as claimed in claim 23, wherein said display means includes means for representing whether or not the cashless communication is available based upon the identification information added to preselected telephone number data.

* * * * *